US012676685B2

(12) United States Patent
Lu et al.

(10) Patent No.: US 12,676,685 B2
(45) Date of Patent: Jul. 7, 2026

(54) BEAM QUALITY MONITORING METHOD AND APPARATUS, AND DEVICE AND MEDIUM

(71) Applicant: DATANG MOBILE COMMUNICATIONS EQUIPMENT CO., LTD., Beijing (CN)

(72) Inventors: Yiwen Lu, Beijing (CN); Qiuping Huang, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 346 days.

(21) Appl. No.: 18/681,302

(22) PCT Filed: Jul. 19, 2022

(86) PCT No.: PCT/CN2022/106471
§ 371 (c)(1),
(2) Date: Feb. 5, 2024

(87) PCT Pub. No.: WO2023/011163
PCT Pub. Date: Feb. 9, 2023

(65) Prior Publication Data
US 2025/0150177 A1 May 8, 2025

(30) Foreign Application Priority Data
Aug. 6, 2021 (CN) .......................... 202110901975.1

(51) Int. Cl.
*H04B 17/309* (2015.01)
*H04B 7/06* (2006.01)
(Continued)

(52) U.S. Cl.
CPC ......... *H04B 17/309* (2015.01); *H04B 7/0626* (2013.01); *H04L 5/0048* (2013.01); *H04L 5/0094* (2013.01); *H04W 72/231* (2023.01)

(58) Field of Classification Search
CPC ... H04L 5/0023; H04L 5/0048; H04L 5/0094; H04L 25/0224; H04B 7/024;
(Continued)

(56) References Cited

U.S. PATENT DOCUMENTS 11,515,925 B2 * 11/2022 Koskela ............... H04W 24/08
2019/0349061 A1 11/2019 Cirik et al.
(Continued)

FOREIGN PATENT DOCUMENTS

CN 110475360 A 11/2019
CN 111601371 A 8/2020
(Continued)

OTHER PUBLICATIONS

Oppo, Enhancements on beam management for multi-TRP, 3GPP TSG RAN WG1 #104-e, R1-2100121, 7 pages, Jan. 25, to Feb. 5, 2021.*
(Continued)

*Primary Examiner* — Frank Duong
(74) *Attorney, Agent, or Firm* — Meunier Carlin & Curfman LLC

(57) ABSTRACT

Disclosed in the present disclosure are a beam quality monitoring method and apparatus, and a device and a medium. The method includes: a terminal device selecting at least one CORESET as a CORESET to be monitored, which includes a CORESET in an SFN transmission mode; according to an associated CSI RS in an active TCI state in the CORESET to be monitored, determining BFD RSs to be monitored; and performing beam quality monitoring on the basis of each BFD RS to be monitored. In the present
(Continued)

S101
Receiving RRC configuration information and MAC-CE activation information sent by a network device side, and determining an index value of each of CORESETs and at least one TCI state activated in each of the CORESETs according to the RRC configuration information and the MAC-CE activation information S102
Determining a transmission mode of each of the CORESETs according to the activated TCI state in each of the CORESETs, wherein the transmission mode includes a SFN transmission mode and a single-point transmission mode S103
Selecting at least one CORESET as a to-be-monitored CORESET, wherein the to-be-monitored CORESET includes a CORESET in the SFN transmission mode S104
Determining each to-be-monitored BFD RS according to a periodic CSI RS associated with at least one activated TCI state in each to-be-monitored CORESET S105
Performing beam quality monitoring based on each to-be-monitored BFD RS disclosure, the beam quality of at least one CORESET is monitored, and the monitored CORESET includes a CORESET in an SFN transmission mode. CSI RSs of two transmission points are associated in an active TCI state in the CORESET in the SFN transmission mode, and therefore by means of the present disclosure, the beam quality of the two transmission points can be monitored.

20 Claims, 7 Drawing Sheets

(51) Int. Cl.
H04L 5/00 (2006.01)
H04W 72/231 (2023.01)

(58) Field of Classification Search
CPC .......................... H04B 7/0626; H04B 7/06964; H04B 17/309; H04W 24/02; H04W 24/04; H04W 24/08; H04W 24/10; H04W 72/231
See application file for complete search history.

(56) References Cited

U.S. PATENT DOCUMENTS

| | | | |
|---|---|---|---|
| 2019/0349964 A1 | 11/2019 | Liou | |
| 2022/0295498 A1* | 9/2022 | Zhu | H04W 56/001 |
| 2022/0302988 A1* | 9/2022 | Bai | H04B 7/0695 |

FOREIGN PATENT DOCUMENTS

| | | |
|---|---|---|
| CN | 111817835 A | 10/2020 |
| WO | 2019095963 A1 | 5/2019 |

OTHER PUBLICATIONS

Moderator (Intel Corporation), "Summary#1 of AI: 8.1.24 Enhancements on HST-SFN Deployment," 3GPP TSG RAN WG1 #105-e, R1-2106090, e-Meeting, May 10-27, 2021.

Ericsson, "Enhancement on HST-SFN deployment," 3GPP TSG-RAN WG1 Meeting #105-e, Tdoc R1-2105586, e-Meeting, May 10-27, 2021.

Qualcomm Incorporated, "Enhancements on HST-SFN deployment," 3GPP TSG-RAN WG1 Meeting #104bis-e, R1-2104657, e-Meeting, May 10-27, 2021.

Vivo, "Further discussion and evaluation on HST-SFN schemes," 3GPP TSG RAN WG1 #104-e, R1-2100425, e-Meeting, Jan. 25-Feb. 5, 2021.

Extended European Search Report, EP Patent Application 22851877.5, Nov. 19, 2024.

Notice of Reasons for Refusal, JP Patent Application 2024-507030. Dec. 16, 2024.

Concise Explanation of Relevance, CN Patent Application 202110901975.1, Nov. 23, 2024.

* cited by examiner

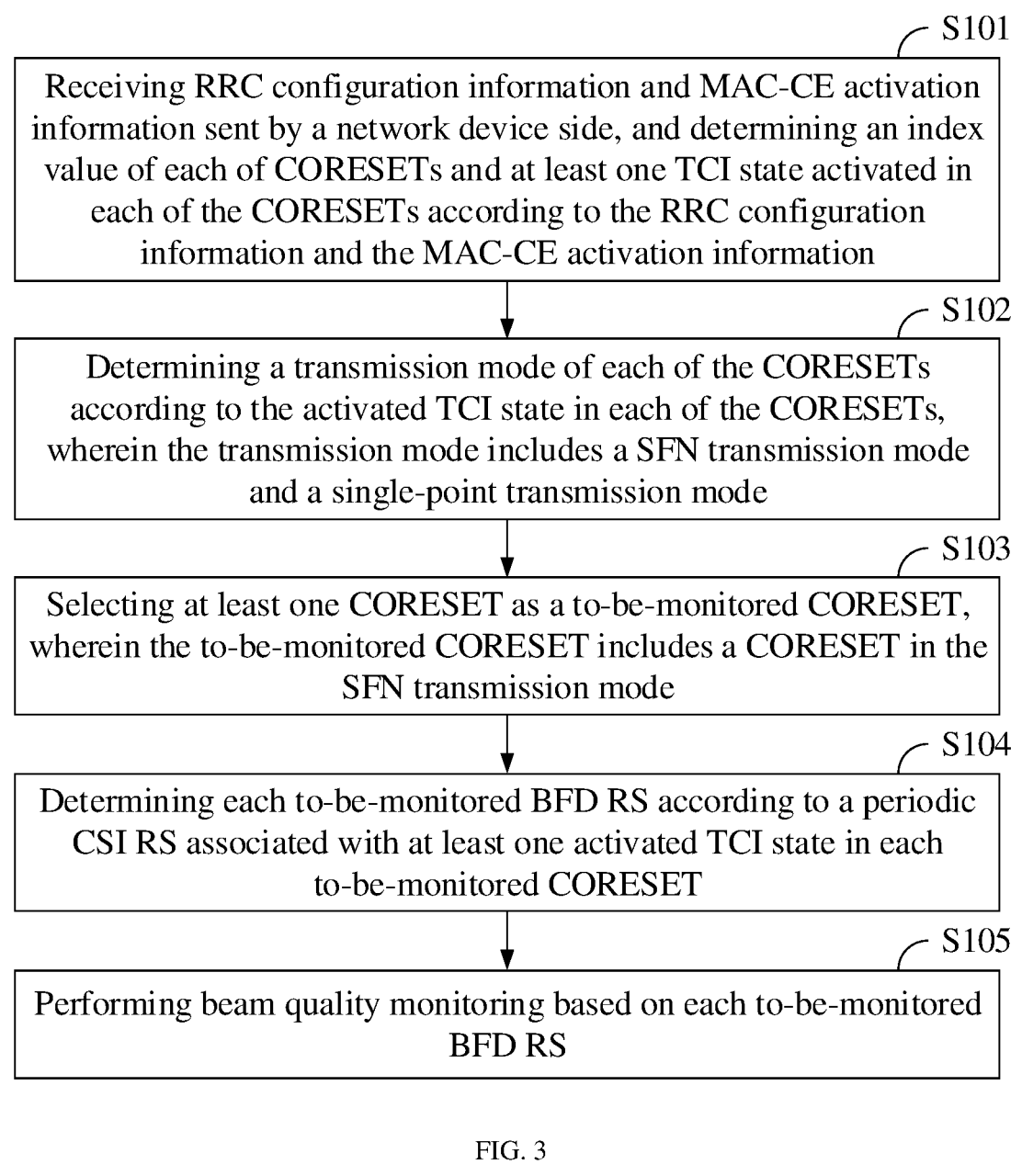

S101

Receiving RRC configuration information and MAC-CE activation information sent by a network device side, and determining an index value of each of CORESETs and at least one TCI state activated in each of the CORESETs according to the RRC configuration information and the MAC-CE activation information

S102

Determining a transmission mode of each of the CORESETs according to the activated TCI state in each of the CORESETs, wherein the transmission mode includes a SFN transmission mode and a single-point transmission mode

S103

Selecting at least one CORESET as a to-be-monitored CORESET, wherein the to-be-monitored CORESET includes a CORESET in the SFN transmission mode

S104

Determining each to-be-monitored BFD RS according to a periodic CSI RS associated with at least one activated TCI state in each to-be-monitored CORESET

S105

Performing beam quality monitoring based on each to-be-monitored BFD RS

FIG. 3

BEAM QUALITY MONITORING METHOD AND APPARATUS, AND DEVICE AND MEDIUM

CROSS REFERENCES TO RELATED APPLICATIONS

The present disclosure is a National Stage of International Application No. PCT/CN2022/106471 filed Jul. 19, 2022, which claims the priority to Chinese patent application No. 202110901975.1, filed to China National Intellectual Property Administration on Aug. 6, 2021 and entitled "BEAM QUALITY MONITORING METHOD, APPARATUS, EQUIPMENT, AND MEDIUM", the entire contents of which are incorporated herein by reference.

TECHNICAL FIELD

The present disclosure relates to the technical field of communications, and in particular to a beam quality monitoring method, apparatus, equipment and medium.

BACKGROUND

In the fifth generation (5G) new radio (NR) system, the analog beam forming of a physical downlink control channel (PDCCH) based on each control resource set (CORESET) has been supported. In the NR system, a network device side configures or pre-defines a set of a group of beam failure detection reference signals (BFD RSs) for each serving cell of user equipment(s), and the reference signals in the set are used to reflect the beam quality, i.e., the quality of a transmission configuration indication (TCI) state, of the PDCCH. When receiving powers of all the reference signals included in the set are lower than a specific threshold, a physical layer of the user equipment will indicate a beam failure event to a high layer of the user equipment. When the number of beam failures reaches a certain number within a certain time duration, the user equipment will be triggered to send a beam failure recovery request to the network device side.

In the related art, when the user equipment has not received a radio resource control (RRC) configuration about the BFD RS sent by the network device side, the user equipment may set index value(s) of channel state information reference signal(s) (CSI RS) in the TCI state in the CORESET of the monitored PDCCH as index value(s) of the BFD RS(s) in the BFD RS set, and the UE can only determine two BFD RSs at most. In the related art, a CORESET is generally determined randomly, and then the CSI RS(s) in the TCI state in the CORESET is taken as the BFD RS(s). If two BFD RSs are determined in the CORESET, the beam qualities of the two BFD RSs are calculated. If one BFD RS is determined in the CORESET, another CORESET can be randomly determined, and one CSI RS in the TCI state in another CORESET can be determined as a BFD RS.

If there are two CSI RS indexes in one TCI state at this time, the UE may use the index value of the CSI RS associated with quasi co-located-type D (QCL-typeD) as the index value of the BFD RS.

In the 5G standard Rel-15/16, the CORESET of the PDCCH is in a single-point transmission mode, and it is specified that the UE can only determine two BFD RSs at most in the protocol, which ensures monitoring for the beam quality on the two CORESETs. The monitoring effect in the related art in the 5G standard Rel-15/16 is better. However, in the 5G standard Rel-17, it is proposed to add a new single frequency network (SFN) transmission mode for PDCCH. In this transmission mode, each CORESET can be activated by a medium access control-control element (MAC-CE) with two TCI states, where each TCI state can be at most associated with one piece of QCL-typeA information and one piece of QCL-typeD information. The activated TCI states in the CORESET in the SFN transmission mode are associated with the CSI RSs of two transmission reception points.

The beam quality monitoring manner in the related art has the following problems in the SFN transmission mode.

1. As shown in FIG. 1, when the UE determines the BFD RSs by itself, two BFD RSs may correspond to two different CORESETs. One CORESET contains two TCI states, which is sent in the SFN mode, while the other determined CORESET only contains one TCI state, which is sent in the single-point transmission (S-TRP) mode. But at this time, the two BFD RSs both are associated with two beams of one transmission reception point TRP 1, so the beam failure monitoring at this time can only reflect the real beam quality of the TRP 1. If the beams of TRP1 fail to work, a beam failure event will be triggered at this time, but TRP2 may still work at this time. The beam quality monitoring does not guarantee that the beam qualities of all the transmission reception points can be monitored. Therefore, the beam quality of the PDCCH cannot be truly reflected.

2. As shown in FIG. 2, a possible best case is that two BFD RSs determined by the UE itself correspond to one CORESET sent in the SFN mode. At this time, although the two BFD RSs can reflect the transmission beam qualities of the two TRPs, the UE can only monitor the beam quality of one CORESET. Since the number of CORESETs which are monitored is reduced, the beam monitoring is greatly limited, and cannot accurately reflect the beam quality of the PDCCH.

It can be seen that, in the related art, the monitoring for the beam qualities of two transmission reception points and multiple CORESETs cannot be taken into account, so the problem of the beam quality of the PDCCH cannot be accurately reflected.

SUMMARY

The present disclosure provides a beam quality monitoring method, apparatus, equipment and medium to solve the problem in the related art that the monitoring for the beam qualities of two transmission reception points and multiple CORESETs cannot be taken into account, so the problem of the beam quality of the PDCCH cannot be accurately reflected.

The specific technical solutions provided by the embodiments of the present disclosure are as follows.

In a first aspect, the present disclosure provides a beam quality monitoring method, including:

receiving radio resource control (RRC) configuration information and medium access control-control element (MAC-CE) activation information sent by a network device side, and determining an index value of each of control resource sets (CORESETs) and at least one transmission configuration indication (TCI) state activated in each of the CORESETs according to the RRC configuration information and the MAC-CE activation information;

determining a transmission mode of each of the CORESETs according to the activated TCI state in each of the CORESETs, wherein the transmission mode includes a single frequency network (SFN) transmission mode
and a single-point transmission mode; wherein the
activated TCI state is a TCI state activated in each of
the CORESETs;
selecting at least one CORESET as a to-be-monitored
CORESET, wherein the to-be-monitored CORESET
includes a CORESET in the SFN transmission mode;
determining each to-be-monitored beam failure detection
reference signal (BFD RS) according to a periodic
channel state information reference signal (CSI RS)
associated with at least one activated TCI state in each
to-be-monitored CORESET; and
performing beam quality monitoring based on each to-be-
monitored BFD RS.
Optionally, the selecting at least one CORESET as the
to-be-monitored CORESET includes:
sorting the CORESETs according to a preset priority rule,
and selecting at least one CORESET as the to-be-
monitored CORESET according to a sorting result
obtained by sorting the CORESETs according to the
preset priority rule.
Optionally, the sorting the CORESETs according to the
preset priority rule includes:
sorting the CORESETs according to index values of the
CORESETs; wherein a CORESET with a smaller index
value has a higher priority than a CORESET with a
larger index value; or
sorting the CORESETs according to the transmission
mode of each of the CORESETs; wherein a CORESET
in the SFN transmission mode has a higher priority than
a CORESET in the single-point transmission mode; or
sorting the CORESETs according to the transmission
mode and an index value of each of the CORESETs;
wherein the transmission mode has a higher priority
than the index value, a CORESET in the SFN trans-
mission mode has a higher priority than a CORESET in
the single-point transmission mode, and a CORESET
with a smaller index value has a higher priority than a
CORESET with a larger index value.
Optionally, the determining the transmission mode of
each of the CORESETs according to the activated TCI state
in each of the CORESETs includes:
for each of the CORESETs, determining whether SFN
configuration information of the CORESET exists in
the RRC configuration information;
if the SFN configuration information of the CORESET
exists in the RRC configuration information and it is
determined according to the MAC-CE activation infor-
mation that two TCI states are activated in the CORE-
SET, determining that the transmission mode of the
CORESET is the SFN transmission mode;
if the SFN configuration information of the CORESET
exists in the RRC configuration information and it is
determined according to the MAC-CE activation infor-
mation that one TCI state is activated in the CORESET,
determining that the transmission mode of the CORE-
SET is the single-point transmission mode;
if no SFN configuration information of the CORESET
exists in the RRC configuration information and it is
determined according to the MAC-CE activation infor-
mation that one TCI state is activated in the CORESET,
determining that the transmission mode of the CORE-
SET is the single-point transmission mode.
Optionally, the determining each to-be-monitored BFD
RS according to the CSI RS associated with the at least one
activated TCI state in each to-be-monitored CORESET
includes:

taking all the CSI RS associated with the at least one
activated TCI state in each to-be-monitored CORESET
as the to-be-monitored BFD RS; or
taking all the CSI RS associated with the at least one
activated TCI state in each to-be-monitored CORESET
as a to-be-monitored candidate CSI RS, and selecting a
preset number of to-be-monitored candidate CSI RSs
according to a sorting result for the CORESETs as
to-be-monitored candidate CSI RSs.
Optionally, the performing beam quality monitoring
based on each to-be-monitored BFD RS includes:
separately calculating a beam quality of each to-be-
monitored BFD RS, and triggering a beam failure event
if it is determined that the beam quality of each
to-be-monitored BFD RS satisfies a preset beam failure
condition; or
taking two to-be-monitored BFD RSs associated with one
same CORESET as a BFD RS group, jointly calculat-
ing a beam quality of the two to-be-monitored BFD
RSs in the BFD RS group, separately calculating beam
qualities of BFD RSs of a non-BFD RS group, and
triggering a beam failure event if it is determined that
each beam quality satisfies a preset beam failure con-
dition.
Optionally, the separately calculating the beam quality of
each to-be-monitored BFD RS includes:
for each to-be-monitored BFD RS, determining a mea-
surement output value corresponding to a measurement
scale of the to-be-monitored BFD RS, determining a
block error rate (BLER) value according to the mea-
surement output value, and taking the BLER value as
the beam quality of the to-be-monitored BFD RS.
Optionally, the jointly calculating the beam quality of the
two to-be-monitored BFD RSs in the BFD RS group
includes:
determining measurement output values corresponding to
measurement scales of the two to-be-monitored BFD
RSs in the BFD RS group, respectively, superimposing
the two measurement output values, determining a
BLER value according to a measurement output value
obtained by superimposing the two measurement out-
put values, and taking the BLER value as the beam
quality of the BFD RS group.
In a second aspect, the present disclosure provides a beam
quality monitoring apparatus, including:
a receiving unit, configured to receive radio resource
control (RRC) configuration information and medium
access control-control element (MAC-CE) activation
information sent by a network device side, and deter-
mine an index value of each of control resource sets
(CORESETs) and at least one transmission configura-
tion indication (TCI) state activated in each of the
CORESETs according to the RRC configuration infor-
mation and the MAC-CE activation information;
a first determination unit, configured to determine a
transmission mode of each of the CORESETs accord-
ing to the activated TCI state in each of the CORESETs,
wherein the transmission mode includes a single fre-
quency network (SFN) transmission mode and a single-
point transmission mode;
a second determination unit, configured to select at least
one CORESET as a to-be-monitored CORESET,
wherein the to-be-monitored CORESET includes a
CORESET in the SFN transmission mode;
a third determination unit, configured to determine each
to-be-monitored beam failure detection reference sig-
nal (BFD RS) according to a periodic channel state information reference signal (CSI RS) associated with at least one activated TCI state in each to-be-monitored CORESET; and a monitoring unit, configured to perform beam quality monitoring based on each to-be-monitored BFD RS.

Optionally, the second determination unit is specifically configured to sort the CORESETs according to a preset priority rule, and selecting at least one CORESET as the to-be-monitored CORESET according to a sorting result obtained by sorting the CORESETs according to the preset priority rule.

Optionally, the second determination unit is specifically configured to sort the CORESETs according to index values of the CORESETs, wherein a CORESET with a smaller index value has a higher priority than a CORESET with a larger index value; or sort the CORESETs according to the transmission mode of each of the CORESETs, wherein a CORESET in the SFN transmission mode has a higher priority than a CORESET in the single-point transmission mode; or sort the CORESETs according to the transmission mode and an index value of each of the CORESETs, wherein the transmission mode has a higher priority than the index value, a CORESET in the SFN transmission mode has a higher priority than a CORESET in the single-point transmission mode, and a CORESET with a smaller index value has a higher priority than a CORESET with a larger index value.

Optionally, the first determination unit is specifically configured to, for each of the CORESETs, determine whether SFN configuration information of the CORESET exists in the RRC configuration information; if the SFN configuration information of the CORESET exists in the RRC configuration information and it is determined according to the MAC-CE activation information that two TCI states are activated in the CORESET, determine that the transmission mode of the CORESET is the SFN transmission mode; if the SFN configuration information of the CORESET exists in the RRC configuration information and it is determined according to the MAC-CE activation information that one TCI state is activated in the CORESET, determine that the transmission mode of the CORESET is the single-point transmission mode; and if no SFN configuration information of the CORESET exists in the RRC configuration information and it is determined according to the MAC-CE activation information that one TCI state is activated in the CORESET, determine that the transmission mode of the CORESET is the single-point transmission mode.

Optionally, the third determination unit is specifically configured to take all the CSI RS associated with the at least one activated TCI state in each to-be-monitored CORESET as the to-be-monitored BFD RS; or take all the CSI RS associated with the at least one activated TCI state in each to-be-monitored CORESET as a to-be-monitored candidate CSI RS, and select a preset number of to-be-monitored candidate CSI RSs according to a sorting result for the CORESETs as to-be-monitored candidate CSI RSs.

Optionally, the monitoring unit is specifically configured to separately calculate a beam quality of each to-be-monitored BFD RS, and trigger a beam failure event if it is determined that the beam quality of each to-be-monitored BFD RS satisfies a preset beam failure condition; or take two to-be-monitored BFD RSs associated with one same CORESET as a BFD RS group, jointly calculate a beam quality of the two to-be-monitored BFD RSs in the BFD RS group, separately calculate beam qualities of BFD RSs of a non-BFD RS group, and trigger a beam failure event if it is determined that each beam quality satisfies a preset beam failure condition.

Optionally, the monitoring unit is specifically configured to, for each to-be-monitored BFD RS, determine a measurement output value corresponding to a measurement scale of the to-be-monitored BFD RS, determine a block error rate (BLER) value according to the measurement output value, and take the BLER value as the beam quality of the to-be-monitored BFD RS.

Optionally, the monitoring unit is specifically configured to determine measurement output values corresponding to measurement scales of the two to-be-monitored BFD RSs in the BFD RS group, respectively, superimpose the two measurement output values, determine a BLER value according to a measurement output value obtained by superimposing the two measurement output values, and take the BLER value as the beam quality of the BFD RS group.

In a third aspect, the present disclosure provides a user equipment, including:

a memory, configured to store executable instructions; and a processor, configured to read and execute the executable instructions stored in the memory to:

receive radio resource control (RRC) configuration information and medium access control-control element (MAC-CE) activation information sent by a network device side, and determine an index value of each of control resource sets (CORESETs) and at least one transmission configuration indication (TCI) state activated in each of the CORESETs according to the RRC configuration information and the MAC-CE activation information;

determine a transmission mode of each of the CORESETs according to the activated TCI state in each of the CORESETs, wherein the transmission mode includes a single frequency network (SFN) transmission mode and a single-point transmission mode;

select at least one CORESET as a to-be-monitored CORESET, wherein the to-be-monitored CORESET includes a CORESET in the SFN transmission mode;

determine each to-be-monitored beam failure detection reference signal (BFD RS) according to a periodic channel state information reference signal (CSI RS) associated with at least one activated TCI state in each to-be-monitored CORESET; and perform beam quality monitoring based on each to-be-monitored BFD RS.

In a fourth aspect, the present disclosure provides a computer-readable storage medium, wherein when instructions in the computer-readable storage medium are executed by a processor, the processor is enabled to execute the method in the first aspect.

In the embodiments of the present disclosure, the user equipment determines an index value of each CORESET and the TCI state(s) activated in each CORESET according to the RRC configuration information and the MAC-CE activation information, and determines the transmission mode of each CORESET according to the activated TCI state(s) in each CORESET. The user equipment selects at least one CORESET as the to-be-monitored CORESET, wherein the to-be-monitored CORESET includes a CORESET(s) in the SFN transmission mode. Finally, the user equipment determines a to-be-monitored BFD RS(s) according to the CSI RS(s) associated with the activated TCI state(s) in the to-be-monitored CORESET, and performs beam quality monitoring based on each to-be-monitored BFD RS. The beam quality of at least one CORESET is monitored in the present disclosure, and the at least one monitored CORESET includes the CORESET in the SFN transmission mode. Since the activated TCI states in the CORESET in the SFN transmission mode are associated with the CSI RSs of two transmission reception points, the beam qualities of the two transmission reception points can be monitored in the present disclosure. The beam qualities of at least one CORESET and the two transmission reception points are monitored in the present disclosure, which solves the problem in the related art that the beam quality of the PDCCH cannot be accurately reflected.

BRIEF DESCRIPTION OF FIGURES

FIG. 3 is a schematic diagram of a beam quality monitoring process in embodiments of the present disclosure.

DETAILED DESCRIPTION

Figures 1, 2:
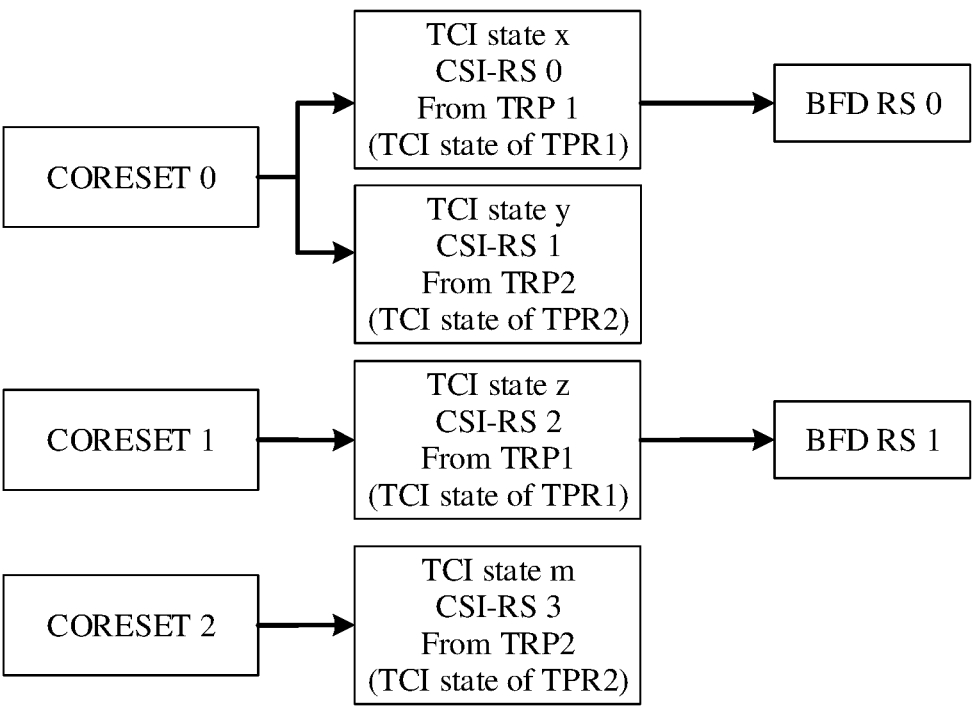
FIG. 1 is an illustration of a process of determining BFD RSs according to CORESETs in a unit frequency band in the related art.
FIG. 2 is another illustration of a process of determining BFD RSs according to CORESETs in a unit frequency band in the related art.

In order to solve the problem in the related art that the beam qualities of two transmission reception points and multiple control resource sets (CORESETs) cannot be monitored at the same time and therefore the beam quality of the PDCCH cannot be accurately reflected, in the embodiments of the present disclosure, the user equipment determines an index value of each CORESET and a transmission configuration indication (TCI) state(s) activated in each CORESET according to radio resource control (RRC) configuration information and medium access control-control element (MAC-CE) activation information, and determines a transmission mode of each CORESET according to the activated TCI state(s) in each CORESET. The user equipment selects at least one CORESET as a to-be-monitored CORESET, where the to-be-monitored CORESET includes CORESET(s) in a single frequency network (SFN) transmission mode. Finally, the user equipment determines a to-be-monitored BFD RS(s) according to a channel state information reference signal(s) (CSI RS) associated with the activated TCI state(s) in the to-be-monitored CORESET, and performs beam quality monitoring based on each to-be-monitored BFD RS. The beam quality of at least one CORESET is monitored in the present disclosure, and the at least one monitored CORESET includes the CORESET in the SFN transmission mode. Since the activated TCI states in the CORESET in the SFN transmission mode are associated with the CSI RSs of two transmission reception points, the beam qualities of the two transmission reception points can be monitored in the present disclosure. The beam qualities of at least one CORESET and the two transmission reception points are monitored in the present disclosure, which solves the problem in the related art that the beam quality of the PDCCH cannot be accurately reflected.

The acronyms and English definitions involved in the present disclosure are shown in the following table.

| 3GPP | $3^{rd}$ Generation Partnership Project |
|---|---|
| 5G | $5^{th}$ Generation |
| 6G | $6^{th}$ Generation |
| DL | DownkLink |
| UL | UpLink |
| CSI | Channel State Information |
| CSI-RS | Channel State Information Reference Signal |
| DMRS | Demodulation Reference Signal |
| CC | Component Carrier |
| DCI | Downlink Control Information |
| LTE | Long-Term Evolution |
| MAC | Medium Access Control |
| MAC-CE | MAC-Control Element |
| MCS | Modulation and Coding Scheme |
| MIMO | Multiple Input Multiple Output |
| NR | New Radio |
| OFDM | Orthogonal Frequency Division Multiplexing |
| DFT-S-OFDM | Discrete Fourier Transform-Spread-OFDM |
| PDCCH | Physical Downlink Control CHannel |
| PDSCH | Physical Downlink Share CHannel |
| PUSCH | Physical Uplink Share CHannel |
| PUCCH | Physical Uplink Control CHannel |
| RI | Rank Indicator |
| TRI | Transmission Rank Indicator |
| TRS | Tracking Reference Signal |
| RRC | Radio Resource Control |
| SRS | Sounding Reference Signaling |
| SRI | SRS resource indicator |
| TCI | Transmission Configuration Indicator |
| TRP | Transmission/Reception Point Panel |
| PMI | Pre-coding Matrix Indicator |
| TPMI | Transmission Pre-coding Matrix Indicator |
| UE | User Equipment |

FIG. 3 is a schematic diagram of a beam quality monitoring process provided by the present disclosure, including the following steps.

S101: RRC configuration information and MAC-CE activation information sent by a network device side are received, and an index value of each CORESET and at least one TCI state activated in each CORESET are determined according to the RRC configuration information and the MAC-CE activation information.

The network device side sends RRC configuration information of the PDCCH and MAC-CE activation information of the PDCCH to the user equipment, wherein the RRC configuration information includes configuration information of the PDCCH transmission mode, and the MAC-CE activation information includes one or more TCI states activated in each CORESET. Specifically, the execution steps on the network device side are described as below.

1) Step 1: the network device side sends RRC configuration information of the PDCCH to the user equipment, wherein the RRC configuration information includes configuration information of the PDCCH transmission mode, M pieces of TCI configuration information of each CORESET, etc.

2) Step 2: the network device side may activate one or two pieces of TCI state configuration information from M pieces of TCI state configuration information in the RRC configuration through the MAC-CE information, wherein each TCI state can be at most associated with one piece of QCL-typeA information and one piece of QCL-typeD information.

3) Step 3: the network device side sends the PDCCH to the user equipment through the TCI state(s) activated by the MAC-CE information.

The user equipment receives the RRC configuration information of the PDCCH and the MAC-CE activation information of the PDCCH sent by the network device side, and determines an index value of each CORESET and a TCI state(s) activated in each CORESET according to the RRC configuration information and the MAC-CE activation information.

S102: a transmission mode of each CORESET is determined according to the activated TCI state(s) in each CORESET, wherein the transmission mode includes a single frequency network (SFN) transmission mode and a single-point transmission mode.

In the present disclosure, the user equipment determines the transmission mode of each CORESET according to the activated TCI state(s) in each CORESET. Optionally, for each CORESET, if the number of activated TCI states in the CORESET is one, the user equipment determines that the transmission mode of the CORESET is the single-point transmission mode; and if the number of activated TCI states in the CORESET is two, the user equipment determines that the transmission mode of the CORESET is the SFN transmission mode.

S103: at least one CORESET is selected as a to-be-monitored CORESET, wherein the to-be-monitored CORESET includes a CORESET in the SFN transmission mode.

After the index value of each of the CORESETs is determined by the user equipment, the user equipment selects at least one CORESET from the CORESETs as the to-be-monitored CORESET. The number of to-be-monitored CORESETs is not limited in the present disclosure, as long as the at least one selected to-be-monitored CORESET includes a CORESET(s) in the SFN transmission mode.

For example, the user equipment determines that the index values of the CORESETs are CORESET 0, CORESET 1 and CORESET 2 respectively. The transmission mode of CORESET 0 and CORESET 1 is a single-point transmission mode, and the transmission mode of CORESET 2 is a SFN transmission mode. The selected to-be-monitored CORESETs may be CORESET 0 and CORESET 2, or CORESET 1 and CORESET 2, or CORESET 0, CORESET 1, and CORESET 2.

S104: each to-be-monitored beam failure detection reference signal (BFD RS) is determined according to a periodic CSI RS(s) associated with the activated TCI state(s) in each to-be-monitored CORESET.

The user equipment may take the CSI RS(s) associated with the activated TCI state(s) in each to-be-monitored CORESET as the to-be-monitored BFD RS(s), or select a preset number of to-be-monitored CSI RSs as the to-be-monitored BFD RSs from the CRI RSs associated with the activated TCI states in the to-be-monitored CORESETs. The number of the to-be-monitored BFD RSs is not limited in the present disclosure, as long as the selected CSI RS(s) includes the CSI RS(s) associated with the activated TCI state(s) in the at least one to-be-monitored CORESET, and the at least one to-be-monitored CORESET includes at least one CORESET in the SFN transmission mode.

S105: beam quality monitoring is performed based on each to-be-monitored BFD RS.

The user equipment calculates a beam quality of each to-be-monitored BFD RS, and if the user equipment determines that each beam quality satisfies a preset beam failure condition, a beam failure event is triggered. The user equipment may calculate the beam quality of each to-be-monitored BFD RS through the following. The user equipment calculates the block error rate (BLER) value of each to-be-monitored BFD RS, the user equipment determines each beam quality satisfies the preset beam failure condition if the user equipment determines that each BLER value is greater than a preset BLER threshold, and a beam failure event is triggered. The preset BLER threshold may be 10%.

In the embodiments of the present disclosure, the user equipment determines the index value of each CORESET and the TCI state(s) activated in each CORESET according to the RRC configuration information and the MAC-CE activation information, and determines the transmission mode of each CORESET according to the activated TCI state(s) in each CORESET. The user equipment selects at least one CORESET as the to-be-monitored CORESET, wherein the to-be-monitored CORESET includes the CORESET(s) in the SFN transmission mode. Finally, the user equipment determines the to-be-monitored BFD RS(s) according to the CSI RS(s) associated with the activated TCI state(s) in the to-be-monitored CORESET, and performs beam quality monitoring based on each to-be-monitored BFD RS. The beam quality of at least one CORESET is monitored in the present disclosure, and the at least one monitored CORESET includes the CORESET in the SFN transmission mode. Since the activated TCI states in the CORESET in the SFN transmission mode are associated with the CSI RSs of two transmission reception points, the beam qualities of the two transmission reception points can be monitored in the present disclosure. The beam qualities of at least one CORESET and the two transmission reception points are monitored in the present disclosure, which solves the problem in the related art that the beam quality of the PDCCH cannot be accurately reflected.

In order to facilitate the selecting for the to-be-monitored CORESET(s), in the present disclosure, the selecting at least one CORESET as the to-be-monitored CORESET includes: sorting the CORESETs according to a preset priority rule, and selecting at least one CORESET as the to-be-monitored CORESET according to a sorting result obtained by sorting the CORESETs according to the preset priority rule.

The user equipment saves the preset priority rule. After the CORESETs are determined, the user equipment sorts the CORESETs according to the preset priority rule, and then selects at least one CORESET as the to-be-monitored CORESET according to the sorting result. For example, after the sorting is completed, at least one CORESET is selected as the to-be-monitored CORESET in a sequence from front to back.

In the present disclosure, the sorting the CORESETs according to the preset priority rule includes:

sorting the CORESETs according to index values of the CORESETs; wherein a CORESET with a smaller index value has a higher priority than a CORESET with a larger index value; or sorting the CORESETs according to the transmission mode of each of the CORESETs; wherein a CORESET in the SFN transmission mode has a higher priority than a CORESET in the single-point transmission mode; or sorting the CORESETs according to the transmission mode and an index value of each of the CORESETs; wherein the transmission mode has a higher priority than the index value, a CORESET in the SFN transmission mode has a higher priority than a CORESET in the single-point transmission mode, and a CORESET with a smaller index value has a higher priority than a CORESET with a larger index value.

The preset priority rule in the present disclosure includes the following rules.

The first rule is to sort the CORESETs only according to the index values of the CORESETs, wherein the CORESET with the smaller index value has the higher priority than the CORESET with the larger index value. For example, the CORESETs determined by the user equipment are CORE-SET 0, CORESET 1 and CORESET 2. Then, according to the index values of the CORESETs, the CORESETs are sorted, and the sorting result is also CORESET 0, CORE-SET 1, and CORESET 2. If the transmission mode of CORESET 0 or CORESET 1 is the SFN transmission mode, the user equipment may take CORESET 0 and CORESET 1 as the to-be-monitored CORESETs, or take CORESET 0, CORESET 1 and CORESET 2 as the to-be-monitored CORESETs. If the transmission mode of CORESET 0 and CORESET 1 is the single-point transmission mode and the transmission mode of CORESET 2 is the SFN transmission mode, in order to ensure that the selected to-be-monitored CORESET(s) includes a CORESET in the SFN transmission mode, the user equipment may take the CORESET 0, CORESET 1 and CORESET 2 as the to-be-monitored CORESETs.

The second rule is to sort the CORESETs only according to the transmission mode of each CORESET, wherein the CORESET in the SFN transmission mode has the higher priority than the CORESET in the single-point transmission mode. There is no limitation on the ordering of CORESETs with the same transmission mode, as long as the ordering of the CORESETs in the SFN transmission mode is prior to the CORESET(s) in the single-point transmission mode. For example, the CORESETs determined by the user equipment are CORESET 0, CORESET 1 and CORESET 2. If the transmission mode of CORESET 0 and CORESET 1 is the single-point transmission mode and the transmission mode of CORESET 2 is the SFN transmission mode, the sorting result is CORESET 2, CORESET 0, and CORESET 1, or CORESET 2, CORESET 1, and CORESET 0, and then at least one CORESET is selected, according to the sorting result, as the to-be-monitored CORESET from front to back.

The third rule is to sort the CORESETs according to the transmission mode and an index value of each CORESET. The transmission mode has the higher priority than the index value, the CORESET in the SFN transmission mode has the higher priority than the CORESET in the single-point transmission mode, and the CORESET with the smaller index value has the higher priority than the CORESET with the larger index value. That is, the CORESET in the SFN transmission mode are sorted prior to the CORESET in the single-point transmission mode, and the CORESETs of the same transmission mode are sorted according to the index values of them. For example, the CORESETs determined by the user equipment are CORESET 0, CORESET 1, CORE-SET 2, and CORESET 3. If the transmission mode of CORESET 0 and CORESET 2 is the single-point transmission mode and the transmission mode of CORESET 1 and CORESET 3 is the SFN transmission mode, the sorting result is CORESET 1, CORESET 3, CORESET 0, and CORESET 2. Then at least one CORESET is selected, according to the sorting result, as the to-be-monitored CORESET from front to back.

In order to make the determining for the transmission mode of each CORESET more accurate, in the present disclosure, the determining the transmission mode of each CORESET according to the activated TCI state(s) in each CORESET includes:

for each of the CORESETs, determining whether SFN configuration information of the CORESET exists in the RRC configuration information;

if the SFN configuration information of the CORESET exists in the RRC configuration information and it is determined according to the MAC-CE activation information that two TCI states are activated in the CORE-SET, determining that the transmission mode of the CORESET is the SFN transmission mode;

if the SFN configuration information of the CORESET exists in the RRC configuration information and it is determined according to the MAC-CE activation information that one TCI state is activated in the CORESET, determining that the transmission mode of the CORE-SET is the single-point transmission mode;

if no SFN configuration information of the CORESET exists in the RRC configuration information and it is determined according to the MAC-CE activation information that one TCI state is activated in the CORESET, determining that the transmission mode of the CORE-SET is the single-point transmission mode.

In the present disclosure, for each CORESET, first, whether the SFN configuration information of the CORE-SET exists in the RRC configuration information is determined. If it exists, the number of TCI states activated in the CORESET according to the MAC-CE activation information is determined. If it is determined according to the MAC-CE activation information that two TCI states are activated in the CORESET, the transmission mode of the CORESET being the SFN transmission mode is determined. If it is determined according to the MAC-CE activation information that one TCI state is activated in the CORESET, the transmission mode of the CORESET being the single-point transmission mode is determined. If no SFN configuration information of the CORESET exists in the RRC configuration information and it is determined according to the MAC-CE activation information that one TCI state is activated in the CORESET, the transmission mode of the CORESET being the single-point transmission mode is determined.

That is, in the present disclosure, the user equipment side performs the following steps.

1) Step 1: the user equipment determines the transmission mode and TCI configuration information of each to-be-monitored CORESET by receiving the RRC configuration information and the MAC-CE activation information sent by the network device side. Among them, the following cases are included.

A) Case 1: if the SFN configuration information of PDCCH exists in the RRC configuration information and two TCI states are activated in the current CORESET by the MAC-CE information, the UE may consider that the current CORESET is in the SFN transmission mode.

B) Case 2: if the SFN configuration information of PDCCH exists in the RRC configuration information and one TCI state is activated in the current CORESET by the MAC-CE information, the UE may consider that the current CORESET is in the single-point transmission mode.

C) Case 3: if no SFN configuration information of PDCCH exists in the RRC configuration information, and one TCI state is activated in the current CORESET by the MAC-CE information, the UE may consider that the current CORESET is in the single-point transmission mode.

In the present disclosure, the determining each to-be-monitored BFD RS according to the CSI RS associated with the at least one activated TCI state in each to-be-monitored CORESET includes:

> taking all the CSI RS associated with the at least one activated TCI state in each to-be-monitored CORESET as the to-be-monitored BFD RS; or
> taking all the CSI RS associated with the at least one activated TCI state in each to-be-monitored CORESET as a to-be-monitored candidate CSI RS, and selecting a preset number of to-be-monitored candidate CSI RSs according to a sorting result for the CORESETs as to-be-monitored candidate CSI RSs.

In the present disclosure, determining each to-be-monitored BFD RS includes the following modes.

Mode 1: after each to-be-monitored CORESET is determined, the number of to-be-monitored BFD RSs is not limited, and all the CSI RS(s) associated with the activated TCI state(s) in each to-be-monitored CORESET are taken as the to-be-monitored BFD RS(s). For example, the determined to-be-monitored CORESETs are CORESET 0, CORESET 1 and CORESET 2. The CSI RSs associated with the TCI state(s) activated in CORESET 0 are CSI RS 0 and CSI RS 1, the CSI RSs associated with the TCI state(s) activated in CORESET 1 are CSI RS 2 and CSI RS 3, and the CSI RS associated with the TCI state activated in CORESET 2 is CSI RS 4. Then, CSI RS 0, CSI RS 1, CSI RS 2, CSI RS 3, and CSI RS 4 are all taken as the to-be-monitored BFD RSs.

Mode 2: after each to-be-monitored CORESET is determined, all the CSI RS(s) associated with the activated TCI state(s) in each to-be-monitored CORESET is taken as to-be-monitored candidate CSI RS(s), and then a preset number of to-be-monitored candidate CSI RSs is selected as the to-be-monitored BFD RSs according to the sorting result of the CORESETs. It needs to be ensured that, the preset number of to-be-monitored candidate CSI RSs includes the CSI RS(s) associated with the activated TCI state(s) in at least one to-be-monitored CORESET, and the at least one to-be-monitored CORESET includes at least one CORESET in the SFN transmission mode. For example, the determined to-be-monitored CORESETs are CORESET 0, CORESET 1 and CORESET 2. The CSI RSs associated with the TCI state(s) activated in CORESET 0 are CSI RS 0 and CSI RS 1, the CSI RSs associated with the TCI state(s) activated in CORESET 1 are CSI RS 2 and CSI RS 3, and the CSI RS associated with the TCI state activated in CORESET 2 is CSI RS 4. The preset number is 4, and CSI RS 0, CSI RS 1, CSI RS 2, and CSI RS 3 are taken as the to-be-monitored BFD RSs.

That is, in the present disclosure, the user equipment side performs the following steps.

2) Step 2: The user equipment may dynamically determine more BFD RSs in the BFD RS set according to the TCI states in the monitored CORESETs, the priority rule, and the maximum number X of CORESETs and/or the maximum number of BFD RSs.

A) Step 2-1: first, the UE determines the CORESETs associated with the BFD RSs through the priority rule of all the CORESETs that can be monitored within the current bandwidth and the maximum number X of CORESETs, which specifically includes the following modes.

If there are A number of CORESETs in the current bandwidth that are in the SFN transmission modes, A number of CORESETs in the SFN transmission will be determined preferentially, which can be divided into the following two cases.

1. If $A<=X$, A number of CORESETs is selected, and $(X-A)$ number of CORESETs in the single-point transmission mode is continually selected.

2. If $A>X$, the first X number of CORESETs among the A number of CORESETs is selected according to the index values.

B) Step 2-2: the UE determines Y number of BFD RSs by the determined X number of CORESETs and/or the maximum number Y of BFD RSs, which includes the following two modes.

Mode 1: the UE may take B number of periodic CSI RSs associated with QCL in TCI states in X number of CORESETs as all BFD RSs.

Mode 2: the UE may take B number of periodic CSI RSs associated with QCL in TCI states in X number of CORESETs as candidate CSI RSs, and then select Y number of candidate CSI RSs as BFD RSs according to the sorting result of the CORESETs, which can be divided into the following two cases.

1. If $B<=Y$, there is no need to continue to determine other BFD RSs.

2. If $B>Y$, the UE selects the first Y number of CSI RSs among the B number of CSI RSs as the BFD RSs.

In order to make the monitored beam quality better reflect the beam quality of the PDCCH, in the present disclosure, performing beam quality monitoring based on each to-be-monitored BFD RS includes:

> separately calculating a beam quality of each to-be-monitored BFD RS, and triggering a beam failure event if it is determined that the beam quality of each to-be-monitored BFD RS satisfies a preset beam failure condition; or
> taking two to-be-monitored BFD RSs associated with one same CORESET as a BFD RS group, jointly calculating a beam quality of the two to-be-monitored BFD RSs in the BFD RS group, separately calculating beam qualities of BFD RSs of a non-BFD RS group, and triggering a beam failure event if it is determined that each beam quality satisfies a preset beam failure condition.

In the present disclosure, performing beam quality monitoring based on each to-be-monitored BFD RS includes the following modes.

Mode 1: the beam quality of each to-be-monitored BFD RS is separately calculated, and for each determined beam quality, whether the beam quality satisfies a preset beam failure condition is determined. If it is determined that each beam quality satisfies the preset beam failure condition, a beam failure event is triggered.

Mode 2: two to-be-monitored BFD RSs associated with the same CORESET are taken as a BFD RS group, then the beam quality of the BFD RS group is jointly calculated, and the beam qualities of the BFD RSs in the non-BFD RS group are calculated separately. Finally, for each determined beam quality, whether the beam quality satisfies a preset beam failure condition is determined. If it is determined that each beam quality satisfies the preset beam failure condition, a beam failure event is triggered.

Because for two to-be-monitored BFD RSs associated with the same CORESET, the beam quality of the BFD RS group is jointly calculated, which can more accurately reflect the beam quality of the CORESET, and which can better reflect the beam quality of the PDCCH compared with the mode of separately calculating the beam qualities of all the to-be-monitored BFD RSs.

The separately calculating the beam quality of each to-be-monitored BFD RS includes:

for each to-be-monitored BFD RS, determining a measurement output value corresponding to a measurement scale of the to-be-monitored BFD RS, determining a block error rate (BLER) value according to the measurement output value, and taking the BLER value as the beam quality of the to-be-monitored BFD RS.

Each to-be-monitored BFD RS is received and measured for channel estimation, and the measurement output is performed according to the measurement scale to obtain the measurement output value corresponding to the measurement scale, wherein the measurement scale may be any one of a signal to interference plus noise ratio (SINR), a signal noise ratio (SNR), or a reference signal receiving power (RSRP). After the measurement output value corresponding to the measurement scale is determined, the BLER value is determined according to the measurement output value, and the BLER value is taken as the beam quality of the to-be-monitored BFD RS. If each determined BLER value is greater than a preset BLER threshold, a beam failure event is triggered.

The jointly calculating the beam quality of the two to-be-monitored BFD RSs in the BFD RS group includes:

determining measurement output values corresponding to measurement scales of the two to-be-monitored BFD RSs in the BFD RS group, respectively, superimposing the two measurement output values, determining a BLER value according to a measurement output value obtained by superimposing the two measurement output values, and taking the BLER value as the beam quality of the BFD RS group.

The two to-be-monitored BFD RSs in the BFD RS group are respectively measured for channel estimation, and the measurement output is performed according to the measurement scale to obtain the measurement output values corresponding to the two to-be-monitored BFD RSs respectively. A new measurement output value is obtained by superimposing the measurement output values corresponding to the two to-be-monitored BFD RSs in the group, a BLER value is determined according to the new measurement output value, and the BLER value is taken as the beam quality of the BFD RS group. The superimposing of the measurement output values corresponding to the two to-be-monitored BFD RSs in the group may be performed by directly adding the measurement output values corresponding respectively to the two to-be-monitored BFD RSs; or the superimposing may be performed by assigning weight values to the two to-be-monitored BFD RSs respectively, and performing a weighted calculation according to the measurement output values and the weight values corresponding to the two to-be-monitored BFD RSs, to obtain the new measurement output value.

That is, in the present disclosure, the user equipment side performs the following steps.

3) Step 3: after the user equipment determines the BFD RSs in the BFD RS group, the user equipment can measure the beam qualities of all the BFD RSs and perform threshold comparisons in the following different modes to determine whether the beam failure occurs at the current moment, and indicate a beam failure event to the high layer of the user equipment once.

A) Mode 1: if at the current moment, there are two BFR RSs associated with two TCI states of the same CORESET in the BFD RSs determined by the user equipment, the user equipment may jointly calculate the beam quality of the two BFD RSs and compare it with a defined threshold, and separately calculate the beam qualities of other BFD RSs. If all the calculated beam qualities are greater than the threshold, a beam failure event is indicated to the high layer of the user equipment once.

B) Mode 2: if at the current moment, there are no two BFR RSs associated with two TCI states of the same CORESET in the BFD RSs determined by the user equipment, the user equipment may separately calculate the beam quality of each BFD RS and compare it with a defined threshold. If the beam qualities of all the BFD RSs are greater than the threshold, a beam failure event is indicated to the high layer of the user equipment once.

4) Step 4: when the number of beam failures reaches a certain number within a certain time duration (obtained by the RRC configuration), the user equipment will be triggered to send a beam failure recovery request to the network device side.

Preferred embodiments of the present disclosure will be further described in detail below in conjunction with the accompanying drawings.

The present disclosure proposes a beam quality monitoring method. When the PDCCH is transmitted downlink from different transmission reception points in the SFN transmission mode, the user equipment may monitor the transmission beam quality of each transmission reception point and the beam qualities of more CORESETs, which solves the problem of poor communication performance in the beam quality monitoring method in the related art.

If the UE receives no RRC configuration from the network device side, the UE may dynamically determine more BFD RSs in the BFD RS set according to the TCI states in the monitored CORESETs, the priority rule, and the maximum number of CORESETs and/or the maximum number of BFD RSs.

First, the UE may determine the CORESETs associated with the BFD RSs through different priority rules and/or the maximum number of CORESETs. Then, the UE may dynamically determine the BFD RSs through the determined CORESETs and/or the maximum number of BFD RSs.

After the user equipment has determined more BFD RSs in the BFD RS group, it can measure the beam qualities of all the BFD RSs and compare them with a threshold(s) through the following different cases, to determine whether the beam failure occurs at the current moment, indicate a beam failure event to the high layer of the user equipment once, and when the number of beam failures reaches a certain number within a certain period of time, trigger the user equipment to send a beam failure recovery request to the network device side.

Case 1: if two BFD RSs in the BFD RSs determined by the current user equipment are associated with two TCI states in the same CORESET, the user equipment may jointly calculate the beam quality of the two BFD RSs and compare it with a defined threshold, and separately calculate the beam qualities of other BFD RSs. If all the calculated beam qualities are greater than the threshold, a beam failure event is indicated to the high layer of the user equipment once.

Case 2: if there are no two BFD RSs in the BFD RSs determined by the current user equipment associated with the two TCI states in the same CORESET, the user equipment may separately calculate the beam quality of each BFD RS and compare it with a defined threshold. If all the calculated beam qualities are greater than the threshold, a beam failure event is indicated to the high layer of the user equipment once.

Embodiment 1 (Case 1 in Step 1+Mode 1 in Step 2-2+Mode 1/Mode 2 in Step 3 at the User Equipment Side)

Figures 4, 5:
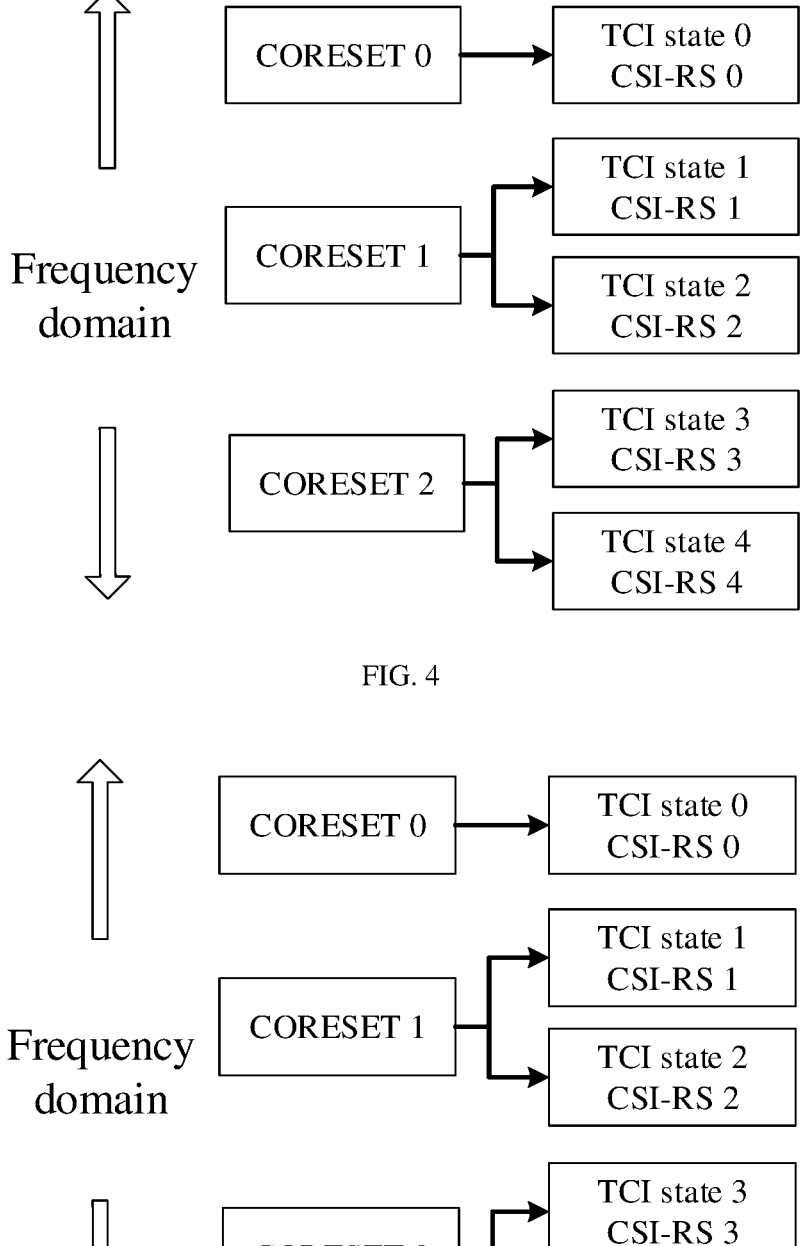
FIG. 4 is an illustration of a process of determining BFD RSs according to CORESETs in a unit frequency band in Embodiment 1 of the present disclosure.
FIG. 5 is an illustration of a process of determining BFD RSs according to CORESETs in a unit frequency band in Embodiment 2 of the present disclosure.

In Embodiment 1, as shown in FIG. 4, it is assumed that the network device side configures 3 CORESETs in each unit frequency band for the user equipment, wherein each of 2 CORESETs is activated by the MAC-CE with two TCI states, and each TCI state is associated with one piece of QCL-typeA information and one piece of QCL-typeD information, and the target QCL reference signal of QCL-typeD is a periodic CSI RS. The specific process is as follows.
Network Device Side 1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.

2) Step 2: the network device side may activate 2 pieces of TCI state configuration information from the 32 pieces of TCI state configuration information in the RRC configuration through the MAC-CE information, wherein each TCI state is associated with one piece of QCL-typeA information and one piece of QCL-typeD information, and the target QCL reference signal of QCL-typeD is the periodic CSI RS. The specific configuration is shown in FIG. 4 below.

3) Step 3: the network device side sends the PDCCH to the user equipment through the TCI state(s) activated by the MAC-CE.
User Equipment Side 1) Step 1: the user equipment determines the TCI configuration information of each CORESET that can be monitored by receiving the RRC configuration information and the MAC-CE activation information sent by the network device side. Here, the configuration transmission mode of each CORESET is as follows.

A) CORESET 0: if the SFN configuration information of PDCCH exists in the RRC configuration information and one TCI state is activated in the current CORESET by the MAC-CE, the UE may consider that the current CORESET is in the single-point transmission mode.

B) CORESET 1: if the SFN configuration information of PDCCH exists in the RRC configuration information and two TCI states are activated in the current CORESET by the MAC-CE, the UE may consider that the current CORESET is in the SFN transmission mode.

C) CORESET 2: if the SFN configuration information of PDCCH exists in the RRC configuration information and two TCI states are activated in the current CORESET by the MAC-CE, the UE may consider that the current CORESET is in the SFN transmission mode.

2) Step 2: the user equipment may dynamically determine all the BFD RSs in the BFD RS set according to the TCI states in the monitored CORESETs, the priority rule, and the maximum number of CORESETs and/or the maximum number of BFD RSs.

A) Step 2-1: first, if the maximum number X of CORESETs associated with the BFD RSs is equal to 2, all the CORESETs that can be monitored by the UE within the current bandwidth are CORESET 0 and CORESET 1.

B) Step 2-2: then, through the mode 1 in this step, there is no need to limit the maximum number of BFD RSs, that is, the UE directly determines Y number of BFD RSs, which specifically includes CSI RS 0, CSI RS 1, and CSI RS 2 in FIG. 4, through the determined 2 CORESETs.

3) Step 3: after the user equipment determines the BFD RSs in the BFD RS group, the user equipment may measure the beam qualities of all the BFD RSs and perform the threshold comparisons in the following different modes to determine whether the beam failure occurs at the current moment, and indicate a beam failure event to the high layer of the user equipment once.

A) Mode 1: at this time, the current CSI RS 0 and CSI RS 1 are associated with two TCI states in the same CORESET, then the user equipment may jointly calculate the beam quality of the two BFD RSs to derive a combined BLER and compare the combined BLER with a defined threshold (10% BLER), and separately calculate the beam qualities of other BFD RSs. If all the beam qualities are greater than the threshold, a beam failure event is indicated to the high layer of the user equipment once.

B) Mode 2: the user equipment directly calculates the beam quality of each CSI RS separately. Specifically, the user equipment may derive a BLER through the SINR of each reference signal and compare it with a defined threshold (10% BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment will be triggered to send a beam failure recovery request to the network device side.

Embodiment 2 (Case 1 in Step 1+Mode 1 in Step 2-2+Mode 1/Mode 2 in Step 3 at the User Equipment Side)

In Embodiment 2, as shown in FIG. 5, it is assumed that the network device side configures 3 CORESETs in each unit frequency band for the user equipment, wherein each of 2 CORESETs is activated by the MAC-CE with two TCI states, and each TCI state is associated with one piece of QCL-typeA information and one piece of QCL-typeD information, and the target QCL reference signal of QCL-typeD is a periodic CSI RS. The specific process is as follows.
Network Device Side 1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.

2) Step 2: the network device side may activate 2 pieces of TCI state configuration information from the 32 pieces of TCI state configuration information in the RRC configuration through the MAC-CE information, wherein each TCI state is associated with one piece of QCL-typeA information and one piece of QCL-typeD information, and the target QCL reference signal of QCL-typeD is the periodic CSI RS. The specific configuration is shown in FIG. 5 below.

3) Step 3: the network device side sends the PDCCH to the user equipment through the TCI state(s) activated by the MAC-CE.

User Equipment Side

1) Step 1: the user equipment determines the TCI configuration information of each CORESET that can be monitored by receiving the RRC configuration information and the MAC-CE activation information sent by the network device side. Among them, the configuration transmission mode of each CORESET is as follows.

A) CORESET 0: if the SFN configuration information of PDCCH exists in the RRC configuration information and one TCI state is activated in the current CORESET by the MAC-CE, the UE may consider that the current CORESET is in the single-point transmission mode.

B) CORESET 1: if the SFN configuration information of PDCCH exists in the RRC configuration information and two TCI states are activated in the current CORESET by the MAC-CE, the UE may consider that the current CORESET is in the SFN transmission mode.

C) CORESET 2: if the SFN configuration information of PDCCH exists in the RRC configuration information and two TCI states are activated in the current CORESET by the MAC-CE, the UE may consider that the current CORESET is in the SFN transmission mode.

2) Step 2: the user equipment may dynamically determine the BFD RSs in the BFD RS set according to the TCI states in the monitored CORESETs, the priority rule, and the maximum number of CORESETs and/or the maximum number of BFD RSs.

A) Step 2-1: first, if the maximum number X of CORESETs associated with the BFD RSs is equal to 2, all the CORESETs that can be monitored by the UE within the current bandwidth are CORESETs 1 and 2.

B) Step 2-2: then, through the mode 1 in this step, there is no need to limit the maximum number of BFD RSs, that is, the UE directly determines Y number of BFD RSs, which specifically includes CSI RS 1, CSI RS 2, CSI RS 3, and CSI RS 4 in FIG. 5, through the determined 2 CORESETs.

3) Step 3: after the user equipment determines the BFD RSs in the BFD RS group, the user equipment may measure the beam qualities of all the BFD RSs and perform the threshold comparisons in the following different modes to determine whether the beam failure occurs at the current moment, and indicate a beam failure event to the high layer of the user equipment once.

A) Mode 1: at this time, the current CSI RS 1 and CSI RS 2 are associated with two TCI states in the same CORESET, and CSI RS 3 and CSI RS 4 are associated with two TCI states in the same CORESET, then the user equipment may jointly calculate the beam quality of the CSI RS 1 and CSI RS 2, and the beam quality of CSI RS 3 and CSI RS 4 to derive combined BLERs and compare the combined BLERs with a defined threshold (10% BLER). If the beam qualities of the two groups of CSI RSs are greater than the threshold, and a beam failure event is indicated to the high layer of the user equipment once.

B) Mode 2: the user equipment directly calculates the beam quality of each CSI RS. Specifically, the user equipment may derive a BLER through the SINR of each reference signal and compare it with a defined threshold (10%

BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment will be triggered to send a beam failure recovery request to the network device side.

Embodiment 3 (Case 1 in Step 1+Mode 2 in Step 2-2+Mode 1/Mode 2 in Step 3 at the User Equipment Side)

Figures 6, 7:
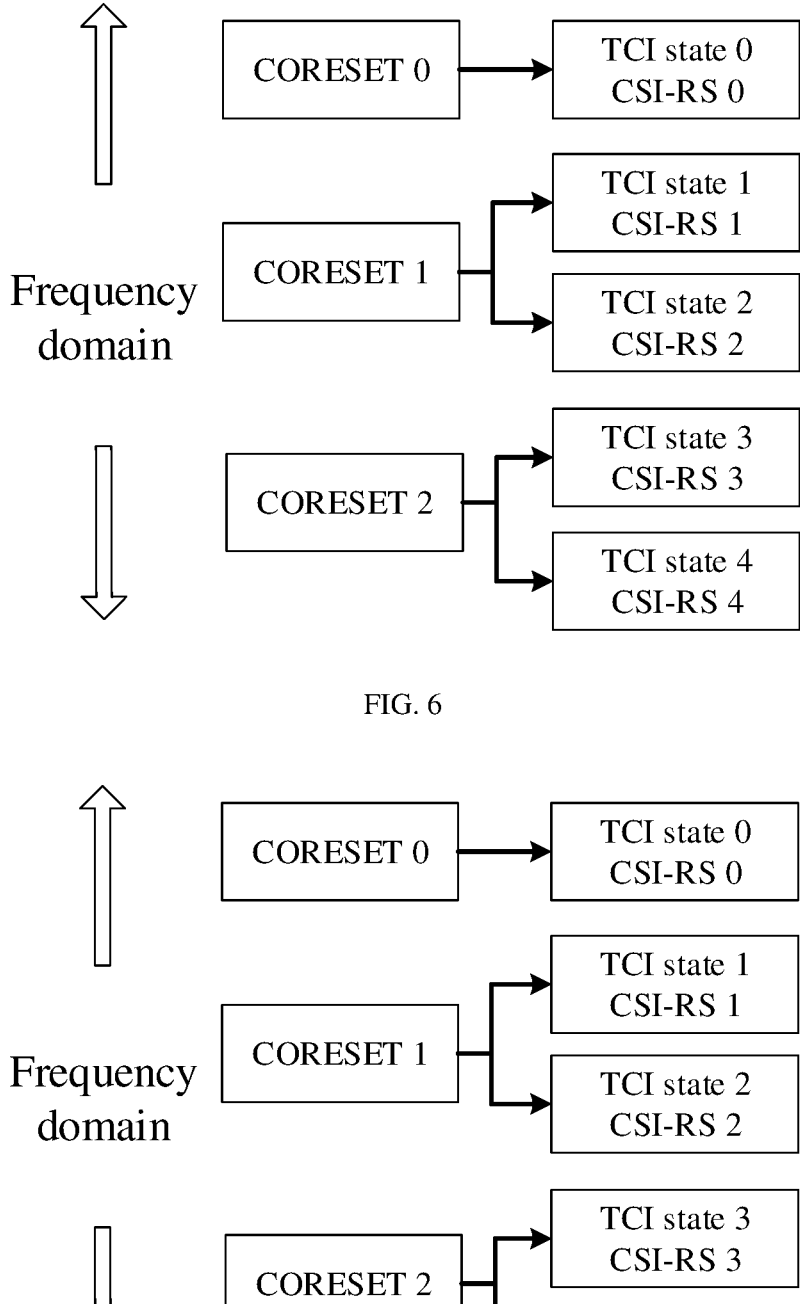
FIG. 6 is an illustration of a process of determining BFD RSs according to CORESETs in a unit frequency band in Embodiment 3 of the present disclosure.
FIG. 7 is an illustration of a process of determining BFD RSs according to CORESETs in a unit frequency band in Embodiment 4 of the present disclosure.

In Embodiment 3, as shown in FIG. 6, it is assumed that the network device side configures 3 CORESETs in each unit frequency band for the user equipment, wherein each of 2 CORESETs is activated by the MAC-CE with two TCI states, and each TCI state is associated with one piece of QCL-typeA information and one piece of QCL-typeD information, and the target QCL reference signal of QCL-typeD is a periodic CSI RS. The specific process is as follows.

Network Device Side

1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.

2) Step 2: the network device side may activate 2 pieces of TCI state configuration information from the 32 pieces of TCI state configuration information in the RRC configuration information through the MAC-CE information, wherein each TCI state is associated with one piece of QCL-typeA information and one piece of QCL-typeD information, and the target QCL reference signal of QCL-typeD is the periodic CSI RS. The specific configuration is shown in FIG. 6 below.

3) Step 3: the network device side sends the PDCCH to the user equipment through the TCI state(s) activated by the MAC-CE.

User Equipment Side

1) Step 1: the user equipment determines the TCI configuration information of each CORESET that can be monitored by receiving the RRC configuration information and the MAC-CE activation information sent by the network device side. Here, the configuration transmission mode of each CORESET is as follows.

A) CORESET 0: if the SFN configuration information of PDCCH exists in the RRC configuration information and one TCI state is activated in the current CORESET by the MAC-CE, the UE may consider that the current CORESET is in the single-point transmission mode.

B) CORESET 1: if the SFN configuration information of PDCCH exists in the RRC configuration information and two TCI states are activated in the current CORESET by the MAC-CE, the UE may consider that the current CORESET is in the SFN transmission mode.

C) CORESET 2: if the SFN configuration information of PDCCH exists in the RRC configuration information and two TCI states are activated in the current CORESET by the MAC-CE, the UE may consider that the current CORESET is in the SFN transmission mode.

2) Step 2: the user equipment may dynamically determine more BFD RSs in the BFD RS set according to the TCI states in the monitored CORESETs, the priority rule, and the maximum number of CORESETs and/or the maximum number of BFD RSs.

A) Step 2-1: first, if the maximum number X of CORESETs associated with the BFD RSs is equal to 2, all the CORESETs that can be monitored by the UE within the current bandwidth are CORESETs 0 and 1.

B) Step 2-2: then, through the mode 2 in this step, if the maximum number Y of BFD RSs is equal to 3 at this time, that is, the UE determines the 3 BFD RSs, which specifically includes CSI RS 0, CSI RS 1 and CSI RS 2 in FIG. 6, through the 2 determined CORESETs.

3) Step 3: after the user equipment determines the BFD RSs in the BFD RS group, the user equipment may measure the beam qualities of all the BFD RSs and perform the threshold comparisons in the following different modes to determine whether the beam failure occurs at the current moment, and indicate a beam failure event to the high layer of the user equipment once.

A) Mode 1: at this time, the current CSI RS 1 and CSI RS 2 are associated with two TCI states in the same CORESET, then the user equipment may jointly calculate the beam quality of the two BFD RSs to derive a combined BLER and compare the combined BLER with a defined threshold (10% BLER). If the jointly calculated BLER at this time is greater than the threshold, a beam failure event will be indicated to the high layer of the user equipment once.

B) Mode 2: the user equipment directly calculates the beam quality of each CSI RS. Specifically, the user equipment may derive a BLER through the SINR of each reference signal and compare it with a defined threshold (10% BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment will be triggered to send a beam failure recovery request to the network device side.

Embodiment 4 (Case 1 in Step 1+Mode 2 in Step 2-2+Mode 1/Mode 2 in Step 3 at the User Equipment Side)

In Embodiment 4, as shown in FIG. 7, it is assumed that the network device side configures 3 CORESETs in each unit frequency band for the user equipment, wherein each of 2 CORESETs is activated by the MAC-CE with two TCI states, and each TCI state is associated with one piece of QCL-typeA information and one piece of QCL-typeD information, and the target QCL reference signal of QCL-typeD is a periodic CSI RS. The specific process is as follows.

Network Device Side

1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.

2) Step 2: the network device side may activate 2 pieces of TCI state configuration information from the 32 pieces of TCI state configuration information in the RRC configuration information through the MAC-CE information, wherein each TCI state is associated with one piece of QCL-typeA information and one piece of QCL-typeD information, and the target QCL reference signal of QCL-typeD is the periodic CSI RS. The specific configuration is shown in FIG. 7 below.

3) Step 3: the network device side sends the PDCCH to the user equipment through the TCI state(s) activated by the MAC-CE.

User Equipment Side

1) Step 1: the user equipment determines the TCI configuration information of each CORESET that can be monitored by receiving the RRC configuration information and the MAC-CE activation information sent by the network device side. Here, the configuration transmission mode of each CORESET is as follows.

A) CORESET 0: if the SFN configuration information of PDCCH exists in the RRC configuration information and one TCI state is activated in the current CORESET by the MAC-CE, the UE may consider that the current CORESET is in the single-point transmission mode.

B) CORESET 1: if the SFN configuration information of PDCCH exists in the RRC configuration information and two TCI states are activated in the current CORESET by the MAC-CE, the UE may consider that the current CORESET is in the SFN transmission mode.

C) CORESET 2: if the SFN configuration information of PDCCH exists in the RRC configuration information and two TCI states are activated in the current CORESET by the MAC-CE, the UE may consider that the current CORESET is in the SFN transmission mode.

2) Step 2: the user equipment may dynamically determine more BFD RSs in the BFD RS set according to the TCI states in the monitored CORESETs, the priority rule, and the maximum number of CORESETs and/or the maximum number of BFD RSs.

a) Step 2-1: first, if the maximum number X of CORESETs associated with the BFD RSs is equal to 2, all the CORESETs that can be monitored by the UE within the current bandwidth are CORESETs 1 and 2.

B) Step 2-2: then, through the mode 2 in this step, if the maximum number Y of BFD RSs is equal to 4 at this time, that is, the UE determines BFD RSs through the 2 determined CORESETs, which specifically are 4 BFD RSs associated with the 2 determined CORESETs, for example, including CSI RS 1, CSI RS 2, CSI RS 3 and CSI RS 4 in FIG. 7.

3) Step 3: after the user equipment determines the BFD RSs in the BFD RS group, the user equipment may measure the beam qualities of all the BFD RSs and perform the threshold comparisons in the following different modes to determine whether the beam failure occurs at the current moment, and indicate a beam failure event to the high layer of the user equipment once.

A) Mode 1: at this time, the current CSI RS 1 and CSI RS 2 are associated with two TCI states in the same CORESET, then the user equipment may jointly calculate the beam quality of the two BFD RSs to derive a combined BLER and compare the combined BLER with a defined threshold (10% BLER). If the jointly calculated BLER at this time is greater than the threshold, a beam failure event is indicated to the high layer of the user equipment once. At this time, the current CSI RS 3 and CSI RS 4 are associated with two TCI states in the same CORESET, then the user equipment can jointly calculate the beam quality of the two BFD RSs to derive a combined BLER and compare the combined BLER with a defined threshold (10% BLER), and if the jointly calculated BLER at this time is greater than the threshold, a beam failure event is indicated to the high layer of the user equipment once.

B) Mode 2: the user equipment directly calculates the beam quality of each CSI RS. Specifically, the user equipment may derive a BLER through the SINR of each reference signal and compare it with a defined threshold (10% BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment is triggered to send a beam failure recovery request to the network device side.

Embodiment 5 (Case 2/Case3 in Step 1+Mode 1 in Step 2-2+Mode 2 in Step 3 at the User Equipment Side)

Figures 8, 9:
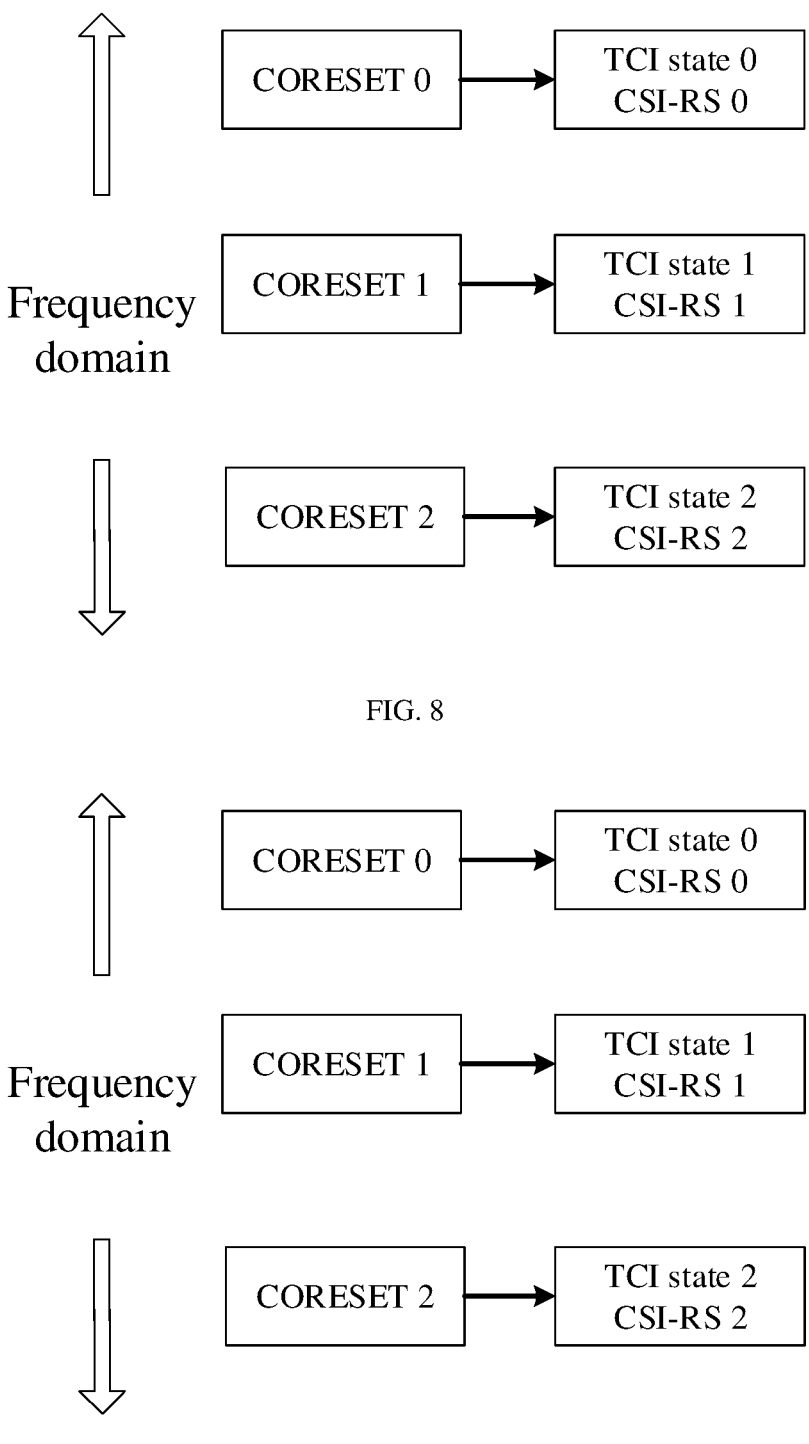
FIG. 8 is an illustration of a process of determining BFD RSs according to CORESETs in a unit frequency band in Embodiment 5 of the present disclosure.
FIG. 9 is an illustration of a process of determining BFD RSs according to CORESETs in a unit frequency band in Embodiment 6 of the present disclosure.

In Embodiment 5, as shown in FIG. 8, it is assumed that the network device side configures 3 CORESETs in each unit frequency band for the user equipment, wherein the CORESETs each are activated by the MAC-CE with one TCI state, and each TCI state is associated with one piece of QCL-typeA information and one piece of QCL-typeD information, and the target QCL reference signal of QCL-typeD is a periodic CSI RS. The specific process is as follows.
Network Device Side
1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.
2) Step 2: the network device side may activate 1 piece of TCI state configuration information from the 32 pieces of TCI state configuration information in the RRC configuration through the MAC-CE information, wherein each TCI state is associated with one piece of QCL-typeA information and one piece of QCL-typeD information, and the target QCL reference signal of QCL-typeD is a periodic CSI RS. The specific configuration is shown in FIG. 8 below.
3) Step 3: the network device side sends the PDCCH to the user equipment through the TCI state(s) activated by the MAC-CE.
User Equipment Side
1) Step 1: the user equipment determines the TCI configuration information of each CORESET that can be monitored by receiving the RRC configuration information and the MAC-CE activation information sent by the network device side. Here, the configuration transmission mode of each CORESET is as follows.
CORESETs 0/1/2: if the SFN configuration information of PDCCH exists in the RRC configuration information and one TCI state is activated in the current CORESET by the MAC-CE, the UE may consider that the current CORESET is in the single-point transmission mode.
2) Step 2: the user equipment may dynamically determine more BFD RSs in the BFD RS set according to the TCI states in the monitored CORESETs, the priority rule, and the maximum number of CORESETs and/or the maximum number of BFD RSs.
a) Step 2-1: first, if the maximum number X of CORESETs associated with the BFD RSs is equal to 3, all the CORESETs that can be monitored by the UE within the current bandwidth are CORESETs 0/1/2.

b) Step 2-2: then, through the mode 1 in this step, there is no need to limit the maximum number of BFD RSs, that is, the UE directly determines Y number of BFD RSs, which specifically includes CSI RS 0, CSI RS 1 and CSI RS 2 in FIG. 8, through the determined 3 CORESETs.
3) Step 3: after the user equipment determines the BFD RSs in the BFD RS group, since there are currently no two BFD RSs associated with one CORESET, the user equipment directly calculates the beam quality of each CSI RS, specifically derives a BLER through the SINR of each reference signal and compares it with a defined threshold (10% BLER). If all the beam qualities are greater than the threshold, a beam failure event is indicated to the high layer of the user equipment once.
4) Step 4: when the number of beam failures reaches a certain number within a certain time duration (obtained by the RRC configuration), the user equipment is triggered to send a beam failure recovery request to the network device side.

Embodiment 6 (Case 2/Case 3 in Step 1+Mode 1 in Step 2-2+Mode 1/Mode 2 in Step 3 at the User Equipment Side)

In Embodiment 6, as shown in FIG. 9, it is assumed that the network device side configures 3 CORESETs in each unit frequency band for the user equipment, wherein the CORESETs each are activated by the MAC-CE with one TCI state, and each TCI state is associated with one piece of QCL-typeA information and one piece of QCL-typeD information, and the target QCL reference signal of QCL-typeD is a periodic CSI RS. The specific process is as follows.
Network Device Side
1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.
2) Step 2: the network device side may activate 1 piece of TCI state configuration information from the 32 pieces of TCI state configuration information in the RRC configuration through the MAC-CE information, wherein each TCI state is associated with one piece of QCL-typeA information and one piece of QCL-typeD information, and the target QCL reference signal of QCL-typeD is a periodic CSI RS. The specific configuration is shown in FIG. 9 below.
3) Step 3: the network device side sends the PDCCH to the user equipment through the TCI state(s) activated by the MAC-CE.
User Equipment Side
1) Step 1: the user equipment determines the TCI configuration information of each CORESET that can be monitored by receiving the RRC configuration information and the MAC-CE activation information sent by the network device side. Here, the configuration transmission mode of each CORESET is as follows.
CORESETs 0/1/2: if the SFN configuration information of PDCCH exists in the RRC configuration information and one TCI state is activated in the current CORESET by the MAC-CE, the UE may consider that the current CORESET is in the single-point transmission mode.
2) Step 2: the user equipment may dynamically determine more BFD RSs in the BFD RS set according to the TCI states in the monitored CORESETs, the priority rule, and the maximum number of CORESETs and/or the maximum number of BFD RSs.

A) Step 2-1: first, if the maximum number X of CORESETs associated with the BFD RSs is equal to 3, all the CORESETs that can be monitored by the UE within the current bandwidth are CORESETs 0/1/2.

B) Step 2-2: then, through the mode 1 in this step, there is no need to limit the maximum number of BFD RSs, that is, the UE directly determines Y number of BFD RSs, which specifically includes CSI RS 0, CSI RS 1, and CSI RS 2 in FIG. 9, through the determined 2 CORESETs.

3) Step 3: after the user equipment determines the BFD RSs in the BFD RS group, since there are currently no two BFD RSs associated with one CORESET, the user equipment directly calculates the beam quality of each CSI RS, specifically derives a BLER through the SINR of each reference signal and compares it with a defined threshold (10% BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment is triggered to send a beam failure recovery request to the network device side.

Embodiment 7 (Case 2/Case 3 in Step 1+Mode 2 in Step 2-2+Mode 1/Mode 2 in Step 3 at the User Equipment Side)

Figures 10, 11:
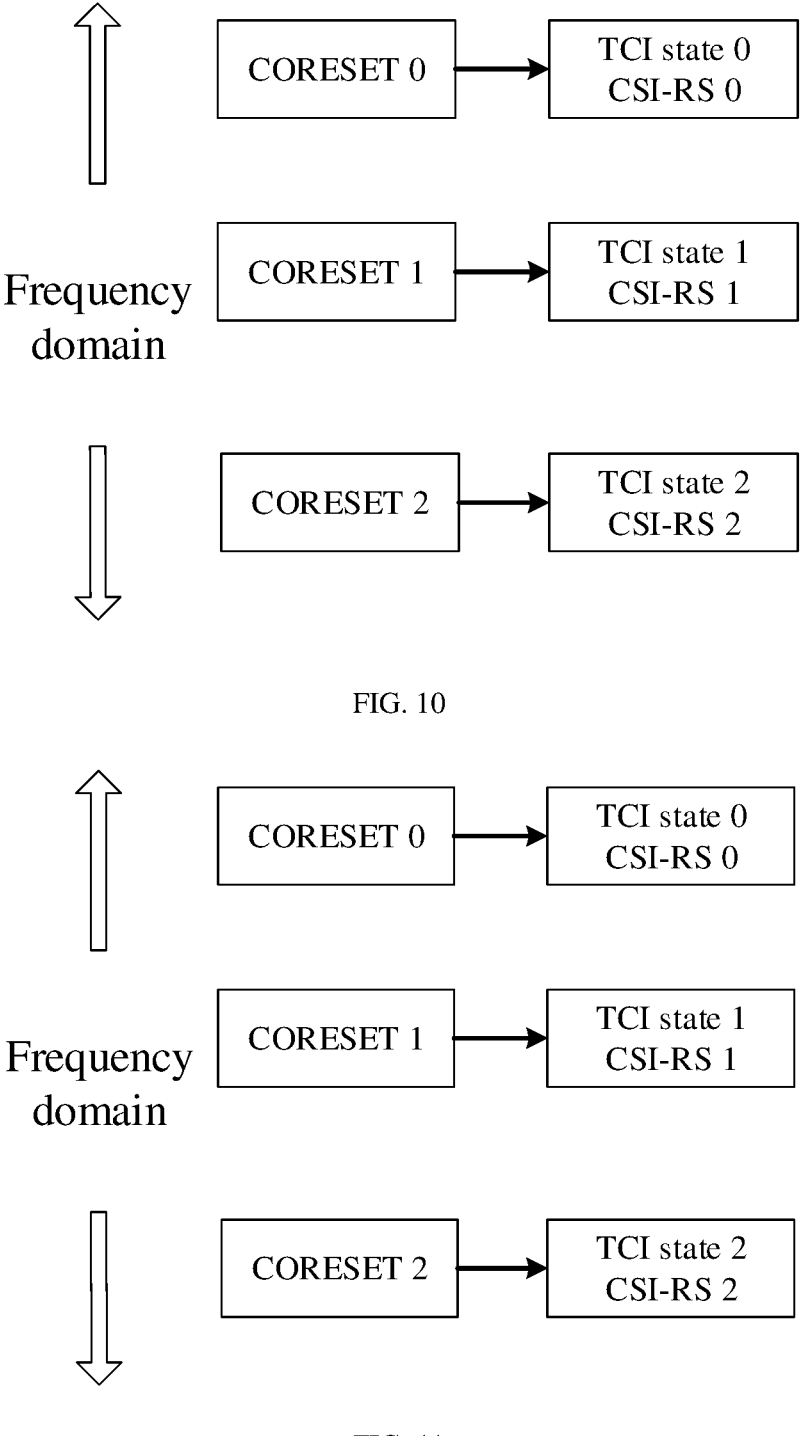
FIG. 10 is an illustration of a process of determining BFD RSs according to CORESETs in a unit frequency band in Embodiment 7 of the present disclosure.
FIG. 11 is an illustration of a process of determining BFD RSs according to CORESETs in a unit frequency band in Embodiment 8 of the present disclosure.

In Embodiment 7, as shown in FIG. 10, it is assumed that the network device side configures 3 CORESETs in each unit frequency band for the user equipment, wherein the CORESETs each are activated by the MAC-CE with one TCI state, and each TCI state is associated with one piece of QCL-typeA information and one piece of QCL-typeD information, and the target QCL reference signal of QCL-typeD is a periodic CSI RS. The specific process is as follows.

Network Device Side

1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.

2) Step 2: the network device side may activate 1 piece of TCI state configuration information from the 32 pieces of TCI state configuration information in the RRC configuration information through the MAC-CE information, wherein each TCI state is associated with one piece of QCL-typeA information and one piece of QCL-typeD information, and the target QCL reference signal of QCL-typeD is a periodic CSI RS. The specific configuration is shown in FIG. 10 below.

3) Step 3: the network device side sends the PDCCH to the user equipment through the TCI state(s) activated by the MAC-CE.

User Equipment Side

1) Step 1: the user equipment determines the TCI configuration information of each CORESET that can be monitored by receiving the RRC configuration information and the MAC-CE activation information sent by the network device side. Here, the configuration transmission mode of each CORESET is as follows.

CORESETs 0/1/2: if the SFN configuration information of PDCCH exists in the RRC configuration information and one TCI state is activated in the current CORESET by the MAC-CE, the UE may consider that the current CORESET is in the single-point transmission mode.

2) Step 2: the user equipment may dynamically determine more BFD RSs in the BFD RS set according to the TCI states in the monitored CORESETs, the priority rule, and the maximum number of CORESETs and/or the maximum number of BFD RSs.

A) Step 2-1: first, if the maximum number X of CORESETs associated with the BFD RSs is equal to 3, all the CORESETs that can be monitored by the UE within the current bandwidth are CORESETs 0/1/2.

B) Step 2-2: then, through the mode 2 in this step, if the maximum number Y of BFD RSs is equal to 2 at this time, that is, the UE determines BFD RSs through the 2 determined CORESETs, which specifically are 2 BFD RSs associated with the 2 determined CORESETs, for example, including CSI RS 0 and CSI RS 1 in FIG. 10.

3) Step 3: after the user equipment determines the BFD RSs in the BFD RS group, since there are currently no two BFD RSs associated with one CORESET, the user equipment directly calculates the beam quality of each CSI RS, specifically, derives a BLER through the SINR of each reference signal and compares it with a defined threshold (10% BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment is triggered to send a beam failure recovery request to the network device side.

Embodiment 8 (Case 2/Case 3 in Step 1+Mode 2 in Step 2-2+Mode 1/Mode 2 in Step 3 at the User Equipment Side)

In Embodiment 8, as shown in FIG. 11, it is assumed that the network device side configures 3 CORESETs in each unit frequency band for the user equipment, wherein the CORESETs each are activated by the MAC-CE with one TCI state, and each TCI state is associated with one piece of QCL-typeA information and one piece of QCL-typeD information, and the target QCL reference signal of QCL-typeD is a periodic CSI RS. The specific process is as follows.

Network Device Side

1) Step 1: the network device side sends the RRC configuration information of the PDCCH to the user equipment, wherein the RRC configuration information includes the configuration information of SFN transmission mode of the PDCCH, and 32 pieces of TCI configuration information of each CORESET, etc. The network device side configures 3 CORESETs in each unit frequency band for the user equipment.

2) Step 2: the network device side may activate 1 piece of TCI state configuration information from the 32 pieces of TCI state configuration information in the RRC configuration information through the MAC-CE information, wherein each TCI state is associated with one piece of QCL-typeA information and one piece of QCL-typeD information, and the target QCL reference signal of QCL-typeD is a periodic CSI RS. The specific configuration is shown in FIG. 11 below.

3) Step 3: the network device side sends the PDCCH to the user equipment through the TCI state(s) activated by the MAC-CE.

User Equipment Side

1) Step 1: the user equipment determines the TCI configuration information of each CORESET that can be monitored by receiving the RRC configuration information and the MAC-CE activation information sent by the network device side. Here, the configuration transmission mode of each CORESET is as follows.

CORESETs 0/1/2: if the SFN configuration information of PDCCH exists in the RRC configuration information and one TCI state is activated in the current CORESET by the MAC-CE, the UE may consider that the current CORESET is in the single-point transmission mode.

2) Step 2: the user equipment may dynamically determine more BFD RSs in the BFD RS set according to the TCI states in the monitored CORESETs, the priority rule, and the maximum number of CORESETs and/or the maximum number of BFD RSs.

A) Step 2-1: first, if the maximum number X of CORESETs associated with the BFD RSs is equal to 3, all the CORESETs that can be monitored by the UE within the current bandwidth are CORESETs 0/1/2.

B) Step 2-2: then, through the mode 2 in this step, if the maximum number Y of BFD RSs is equal to 2 at this time, that is, the UE determines BFD RSs through the 2 determined CORESETs, which specifically are 2 BFD RSs associated with the 2 determined CORESETs, for example, including CSI RS 0 and CSI RS 1 in FIG. 11.

3) Step 3: after the user equipment determines the BFD RSs in the BFD RS group, since there are currently no two BFD RSs associated with one CORESET, the user equipment directly calculates the beam quality of each CSI RS, specifically derives a BLER through the SINR of each reference signal and compares it with a defined threshold (10% BLER). If all the beam qualities are greater than the threshold, a beam failure event is indicated to the high layer of the user equipment once.

4) Step 4: when the number of beam failures reaches a certain number within a certain time duration (obtained by the RRC configuration), the user equipment is triggered to send a beam failure recovery request to the network device side.

The present disclosure proposes a beam quality monitoring method. When the PDCCH is transmitted downlink from different transmission reception points in the SFN transmission mode, the UE can dynamically determine more BFD RSs according to the TCI states in the monitored CORESETs, the priority rule, and the maximum number of CORESETs and/or the maximum number of BFD RSs, so the transmission beam quality of each transmission reception point and the beam qualities of more CORESETs are monitored, which solves the problem of poor communication performance in the beam failure monitoring method in the related art.

Figure 12:
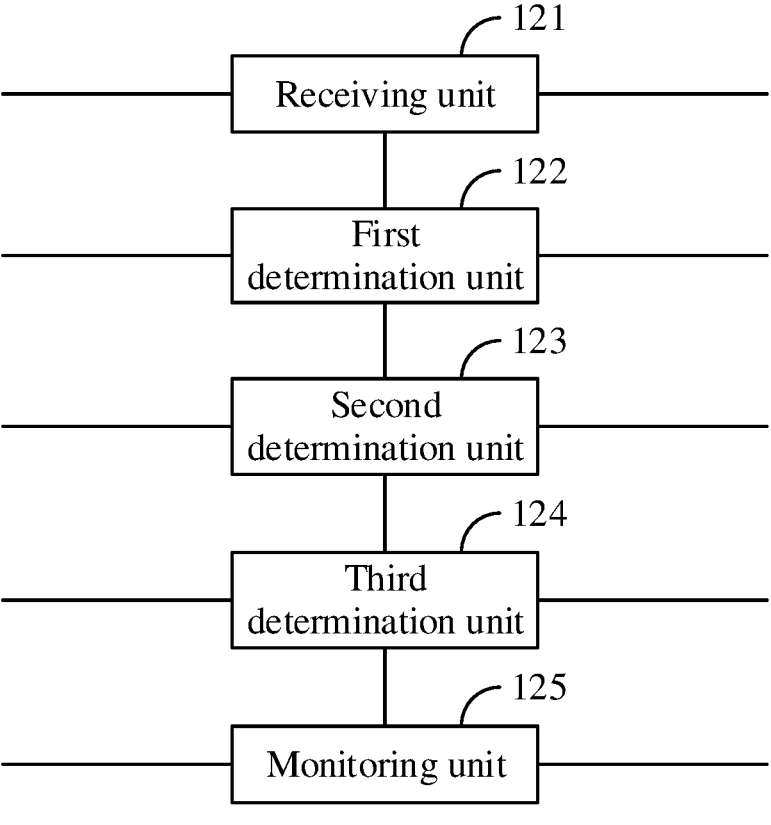
FIG. 12 is a schematic structural diagram of a beam quality monitoring apparatus in embodiments of the present disclosure.

FIG. 12 is a schematic structural diagram of a beam quality monitoring apparatus provided by the present disclosure, including:

a receiving unit 121, configured to receive RRC configuration information and MAC-CE activation information sent by a network device side, and determine an index value of each of CORESETs and at least one TCI state activated in each of the CORESETs according to the RRC configuration information and the MAC-CE activation information;

a first determination unit 122, configured to determine a transmission mode of each of the CORESETs according to the activated TCI state in each of the CORESETs, wherein the transmission mode includes a SFN transmission mode and a single-point transmission mode;

a second determination unit 123, configured to select at least one CORESET as a to-be-monitored CORESET, wherein the to-be-monitored CORESET includes a CORESET in the SFN transmission mode;

a third determination unit 124, configured to determine each to-be-monitored BFD RS according to a periodic CSI RS associated with at least one activated TCI state in each to-be-monitored CORESET; and a monitoring unit 125, configured to perform beam quality monitoring based on each to-be-monitored BFD RS.

The second determination unit 123 is specifically configured to sort the CORESETs according to a preset priority rule, and select at least one CORESET as the to-be-monitored CORESET according to a sorting result obtained by sorting the CORESETs according to the preset priority rule.

The second determination unit 123 is specifically configured to sort the CORESETs according to index values of the CORESETs, wherein a CORESET with a smaller index value has a higher priority than a CORESET with a larger index value; or sort the CORESETs according to the transmission mode of each of the CORESETs, wherein a CORESET in the SFN transmission mode has a higher priority than a CORESET in the single-point transmission mode; or sort the CORESETs according to the transmission mode and an index value of each of the CORESETs, wherein the transmission mode has a higher priority than the index value, a CORESET in the SFN transmission mode has a higher priority than a CORESET in the single-point transmission mode, and a CORESET with a smaller index value has a higher priority than a CORESET with a larger index value.

The first determination unit 122 is specifically configured to, for each of the CORESETs, determine whether SFN configuration information of the CORESET exists in the RRC configuration information; if the SFN configuration information of the CORESET exists in the RRC configuration information and it is determined according to the MAC-CE activation information that two TCI states are activated in the CORESET, determine that the transmission mode of the CORESET is the SFN transmission mode; if the SFN configuration information of the CORESET exists in the RRC configuration information and it is determined according to the MAC-CE activation information that one TCI state is activated in the CORESET, determine that the transmission mode of the CORESET is the single-point transmission mode; and if no SFN configuration information of the CORESET exists in the RRC configuration information and it is determined according to the MAC-CE activation information that one TCI state is activated in the CORESET, determine that the transmission mode of the CORESET is the single-point transmission mode.

The third determination unit 124 is specifically configured to take all the CSI RS associated with the at least one activated TCI state in each to-be-monitored CORESET as the to-be-monitored BFD RS; or take all the CSI RS associated with the at least one activated TCI state in each to-be-monitored CORESET as a to-be-monitored candidate CSI RS, and select a preset number of to-be-monitored candidate CSI RSs according to a sorting result for the CORESETs as to-be-monitored candidate CSI RSs.

The monitoring unit 125 is specifically configured to separately calculate a beam quality of each to-be-monitored BFD RS, and trigger a beam failure event if it is determined that the beam quality of each to-be-monitored BFD RS satisfies a preset beam failure condition; or take two to-be-monitored BFD RSs associated with one same CORESET as a BFD RS group, jointly calculate a beam quality of the two to-be-monitored BFD RSs in the BFD RS group, separately calculate beam qualities of BFD RSs of a non-BFD RS group, and trigger a beam failure event if it is determined that each beam quality satisfies a preset beam failure condition.

The monitoring unit 125 is specifically configured to, for each to-be-monitored BFD RS, determine a measurement output value corresponding to a measurement scale of the to-be-monitored BFD RS, determine a block error rate (BLER) value according to the measurement output value, and take the BLER value as the Beam quality of the to-be-monitored BFD RS.

The monitoring unit 125 is specifically configured to determine measurement output values corresponding to measurement scales of the two to-be-monitored BFD RSs in the BFD RS group, respectively, superimpose the two measurement output values, determine a BLER value according to a measurement output value obtained by superimposing the two measurement output values, and take the BLER value as the beam quality of the BFD RS group.

Figure 13:
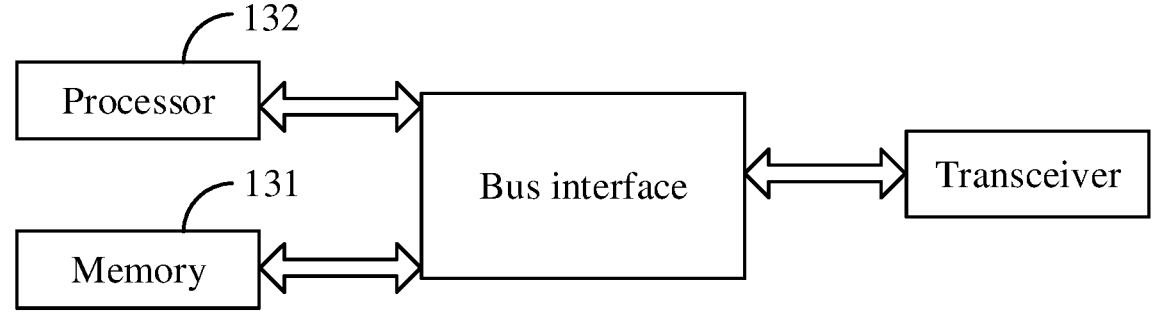
FIG. 13 is a schematic structural diagram of a user equipment in embodiments of the present disclosure.

Based on the same inventive concept, as shown in FIG. 13, an embodiment of the present disclosure provides a user equipment, including:

a memory 131, configured to store executable instructions; and a processor 132, configured to read and execute the executable instructions stored in the memory to:

receive RRC configuration information and MAC-CE activation information sent by a network device side, and determine an index value of each of CORESETs and at least one TCI state activated in each of the CORESETs according to the RRC configuration information and the MAC-CE activation information;

determine a transmission mode of each of the CORESETs according to the activated TCI state in each of the CORESETs, wherein the transmission mode includes a SFN transmission mode and a single-point transmission mode;

select at least one CORESET as a to-be-monitored CORESET, wherein the to-be-monitored CORESET includes a CORESET in the SFN transmission mode;

determine each to-be-monitored BFD RS according to a periodic CSI RS associated with at least one activated TCI state in each to-be-monitored CORESET; and perform beam quality monitoring based on each to-be-monitored BFD RS.

As shown in FIG. 13, the bus architecture may include any number of interconnected buses and bridges. Specifically, one or more processors represented by the processor 132 and various circuits of a memory represented by the memory 131 are linked together. The bus architecture can also link together various other circuits such as peripherals, voltage regulators, and power management circuits, etc., which are well known in the art and therefore will not be further described herein. The bus interface provides the interface. A transceiver may be a plurality of elements, including a transmitter and a receiver, providing units for communicating with various other devices over transmission media. For different user equipments, the user interface may also be an interface capable of connecting externally and internally to required devices, and the connected devices include but not limited to keypads, monitors, speakers, microphones, joysticks, and the like.

The processor 132 is responsible for managing the bus architecture and general processing, and the memory 131 can store data used by the processor 132 when performing operations.

Based on the same inventive concept, an embodiment of the present disclosure provides a computer-readable storage medium. When the instructions in the computer-readable storage medium are executed by a processor, the processor can execute any of the methods performed by the user equipment in each of the above-mentioned embodiments.

To sum up, in the embodiments of the present disclosure, the user equipment determines the index value of each CORESET and the TCI state(s) activated in each CORESET according to the RRC configuration information and the MAC-CE activation information, and determines the transmission mode of each CORESET according to the activated TCI state(s) in each CORESET. The user equipment selects at least one CORESET as the to-be-monitored CORESET, wherein the to-be-monitored CORESET includes the CORESET(s) in the SFN transmission mode. Finally, the user equipment determines the to-be-monitored BFD RS(s) according to the CSI RSs associated with the activated TCI state(s) in the to-be-monitored CORESET, and performs beam quality monitoring based on each to-be-monitored BFD RS. The beam quality of at least one CORESET is monitored in the present disclosure, and the at least one monitored CORESET includes the CORESET in the SFN transmission mode. Since the activated TCI states in the CORESET in the SFN transmission mode are associated with the CSI RSs of two transmission reception points, the beam qualities of the two transmission reception points can be monitored in the present disclosure. The beam qualities of at least one CORESET and the two transmission reception points are monitored in the present disclosure, which solves the problem in the related art that the beam quality of the PDCCH cannot be accurately reflected.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage medium (including but not limited to the disk storage, compact disc read-only memory (CD-ROM), optical storage, etc.) having computer-usable program codes embodied therein.

The present disclosure is described with reference to flowchart illustrations and/or block diagrams of methods, apparatus (systems), and computer program products according to the present disclosure. It should be understood that each procedure and/or block in the flowchart and/or block diagram, and a combination of procedures and/or blocks in the flowchart and/or block diagram can be realized by the computer program instructions. These computer program instructions may be provided to a general purpose computer, special purpose computer, embedded processor, or processor of other programmable data processing equipment to produce a machine such that the instructions executed by the processor of the computer or other programmable data processing equipment produce an apparatus for realizing the functions specified in one or more procedures of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including an instruction apparatus, and the instructions apparatus realizes the function specified in one or more procedures of the flowchart and/or one or more blocks of the block diagram.

These computer program instructions can also be loaded onto a computer or other programmable data processing device, causing a series of operational steps to be performed on the computer or other programmable device to produce a computer-implemented process, thereby The instructions provide steps for implementing the functions specified in one or more procedures of the flowchart and/or one or more blocks of the block diagram.

Obviously, those skilled in the art can make various changes and variations to the present disclosure without departing from the spirit and scope of the present disclosure. Thus, if these modifications and variations of the present disclosure fall within the scope of the claims of the present disclosure and equivalent technologies thereof, the present disclosure also intends to include these modifications and variations.

What is claimed is:

1. A beam quality monitoring method, comprising:

receiving radio resource control (RRC) configuration information and medium access control-control element (MAC-CE) activation information sent by a network device side, and determining an index value of each of control resource sets (CORESETs) and at least one transmission configuration indication (TCI) state activated in each of the CORESETs according to the RRC configuration information and the MAC-CE activation information;

determining a transmission mode of each of the CORESETs according to the activated TCI state in each of the CORESETs, wherein the transmission mode comprises a single frequency network (SFN) transmission mode and a single-point transmission mode;

selecting at least one CORESET as a to-be-monitored CORESET, wherein the to-be-monitored CORESET comprises a CORESET in the SFN transmission mode;

determining each to-be-monitored beam failure detection reference signal (BFD RS) according to a periodic channel state information reference signal (CSI RS) associated with at least one activated TCI state in each to-be-monitored CORESET; and performing beam quality monitoring based on each to-be-monitored BFD RS.

2. The method according to claim 1, wherein the selecting at least one CORESET as the to-be-monitored CORESET, comprises:

sorting the CORESETs according to a preset priority rule, and selecting at least one CORESET as the to-be-monitored CORESET according to a sorting result obtained by sorting the CORESETs according to the preset priority rule.

3. The method according to claim 2, wherein the sorting the CORESETs according to the preset priority rule, comprises:

sorting the CORESETs according to index values of the CORESETs, wherein a CORESET with a smaller index value has a higher priority than a CORESET with a larger index value; or sorting the CORESETs according to the transmission mode of each of the CORESETs, wherein a CORESET in the SFN transmission mode has a higher priority than a CORESET in the single-point transmission mode; or sorting the CORESETs according to the transmission mode and an index value of each of the CORESETs, wherein the transmission mode has a higher priority than the index value, a CORESET in the SFN transmission mode has a higher priority than a CORESET in the single-point transmission mode, and a CORESET with a smaller index value has a higher priority than a CORESET with a larger index value.

4. The method according to claim 1, wherein the determining the transmission mode of each of the CORESETs according to the activated TCI state in each of the CORESETs, comprises:

for each of the CORESETs, determining whether SFN configuration information of the CORESET exists in the RRC configuration information;

if the SFN configuration information of the CORESET exists in the RRC configuration information and it is determined according to the MAC-CE activation information that two TCI states are activated in the CORESET, determining that the transmission mode of the CORESET is the SFN transmission mode;

if the SFN configuration information of the CORESET exists in the RRC configuration information and it is determined according to the MAC-CE activation information that one TCI state is activated in the CORESET, determining that the transmission mode of the CORESET is the single-point transmission mode;

if no SFN configuration information of the CORESET exists in the RRC configuration information and it is determined according to the MAC-CE activation information that one TCI state is activated in the CORESET, determining that the transmission mode of the CORESET is the single-point transmission mode.

5. The method according to claim 1, wherein the determining each to-be-monitored BFD RS according to the CSI RS associated with the at least one activated TCI state in each to-be-monitored CORESET, comprises:

taking all the CSI RS associated with the at least one activated TCI state in each to-be-monitored CORESET as the to-be-monitored BFD RS; or taking all the CSI RS associated with the at least one activated TCI state in each to-be-monitored CORESET as a to-be-monitored candidate CSI RS, and selecting a preset number of to-be-monitored candidate CSI RSs according to a sorting result for the CORESETs as to-be-monitored candidate CSI RSs.

6. The method according to claim 1, wherein the performing beam quality monitoring based on each to-be-monitored BFD RS, comprises:

separately calculating a beam quality of each to-be-monitored BFD RS, and triggering a beam failure event if it is determined that the beam quality of each to-be-monitored BFD RS satisfies a preset beam failure condition; or taking two to-be-monitored BFD RSs associated with one same CORESET as a BFD RS group, jointly calculating a beam quality of the two to-be-monitored BFD RSs in the BFD RS group, separately calculating beam qualities of BFD RSs of a non-BFD RS group, and triggering a beam failure event if it is determined that each beam quality satisfies a preset beam failure condition.

7. The method according to claim 6, wherein the separately calculating the beam quality of each to-be-monitored BFD RS, comprises:

for each to-be-monitored BFD RS, determining a measurement output value corresponding to a measurement scale of the to-be-monitored BFD RS, determining a block error rate (BLER) value according to the measurement output value, and taking the BLER value as the beam quality of the to-be-monitored BFD RS.

8. The method according to claim 6, wherein the jointly calculating the beam quality of the two to-be-monitored BFD RSs in the BFD RS group, comprises:

determining measurement output values corresponding to measurement scales of the two to-be-monitored BFD RSs in the BFD RS group, respectively, superimposing the two measurement output values, determining a BLER value according to a measurement output value obtained by superimposing the two measurement output values, and taking the BLER value as the beam quality of the BFD RS group.

9. A user equipment, comprising:

a memory, configured to store executable instructions; and a processor, configured to read and execute the executable instructions stored in the memory to:

receive radio resource control (RRC) configuration information and medium access control-control element (MAC-CE) activation information sent by a network device side, and determine an index value of each of control resource sets (CORESETs) and at least one transmission configuration indication (TCI) state activated in each of the CORESETs according to the RRC configuration information and the MAC-CE activation information;

determine a transmission mode of each of the CORESETs according to the activated TCI state in each of the CORESETs, wherein the transmission mode comprises a single frequency network (SFN) transmission mode and a single-point transmission mode;

select at least one CORESET as a to-be-monitored CORESET, wherein the to-be-monitored CORESET comprises a CORESET in the SFN transmission mode;

determine each to-be-monitored beam failure detection reference signal (BFD RS) according to a periodic channel state information reference signal (CSI RS) associated with at least one activated TCI state in each to-be-monitored CORESET; and perform beam quality monitoring based on each to-be-monitored BFD RS.

10. The user equipment according to claim 9, wherein the processor is further configured to read and execute the executable instructions stored in the memory to:

sort the CORESETs according to a preset priority rule, and select at least one CORESET as the to-be-monitored CORESET according to a sorting result obtained by sorting the CORESETs according to the preset priority rule.

11. The user equipment according to claim 10, wherein the processor is further configured to read and execute the executable instructions stored in the memory to:

sort the CORESETs according to index values of the CORESETs, wherein a CORESET with a smaller index value has a higher priority than a CORESET with a larger index value; or sort the CORESETs according to the transmission mode of each of the CORESETs, wherein a CORESET in the SFN transmission mode has a higher priority than a CORESET in the single-point transmission mode; or sort the CORESETs according to the transmission mode and an index value of each of the CORESETs, wherein the transmission mode has a higher priority than the index value, a CORESET in the SFN transmission mode has a higher priority than a CORESET in the single-point transmission mode, and a CORESET with a smaller index value has a higher priority than a CORESET with a larger index value.

12. The user equipment according to claim 9, wherein the processor is further configured to read and execute the executable instructions stored in the memory to:

for each of the CORESETs, determine whether SFN configuration information of the CORESET exists in the RRC configuration information;

if the SFN configuration information of the CORESET exists in the RRC configuration information and it is determined according to the MAC-CE activation information that two TCI states are activated in the CORESET, determine that the transmission mode of the CORESET is the SFN transmission mode;

if the SFN configuration information of the CORESET exists in the RRC configuration information and it is determined according to the MAC-CE activation information that one TCI state is activated in the CORESET, determine that the transmission mode of the CORESET is the single-point transmission mode;

if no SFN configuration information of the CORESET exists in the RRC configuration information and it is determined according to the MAC-CE activation information that one TCI state is activated in the CORESET, determine that the transmission mode of the CORESET is the single-point transmission mode.

13. The user equipment according to claim 9, wherein the processor is further configured to read and execute the executable instructions stored in the memory to:

take all the CSI RS associated with the at least one activated TCI state in each to-be- monitored CORESET as the to-be-monitored BFD RS; or take all the CSI RS associated with the at least one activated TCI state in each to-be-monitored CORESET as a to-be-monitored candidate CSI RS, and select a preset number of to-be-monitored candidate CSI RSs according to a sorting result for the CORESETs as to-be-monitored candidate CSI RSs.

14. The user equipment according to claim 9, wherein the processor is further configured to read and execute the executable instructions stored in the memory to:

separately calculate a beam quality of each to-be-monitored BFD RS, and trigger a beam failure event if it is determined that the beam quality of each to-be-monitored BFD RS satisfies a preset beam failure condition; or take two to-be-monitored BFD RSs associated with one same CORESET as a BFD RS group, jointly calculate a beam quality of the two to-be-monitored BFD RSs in the BFD RS group, separately calculate beam qualities of BFD RSs of a non-BFD RS group, and trigger a beam failure event if it is determined that each beam quality satisfies a preset beam failure condition.

15. The user equipment according to claim 14, wherein the processor is further configured to read and execute the executable instructions stored in the memory to:

for each to-be-monitored BFD RS, determine a measurement output value corresponding to a measurement scale of the to-be-monitored BFD RS, determine a block error rate (BLER) value according to the measurement output value, and take the BLER value as the beam quality of the to-be-monitored BFD RS.

16. The user equipment according to claim 14, wherein the processor is further configured to read and execute the executable instructions stored in the memory to:

determine measurement output values corresponding to measurement scales of the two to-be-monitored BFD RSs in the BFD RS group, respectively, superimpose the two measurement output values, determine a BLER value according to a measurement output value obtained by superimposing the two measurement output values, and take the BLER value as the beam quality of the BFD RS group.

17. A non-transitory computer-readable storage medium, wherein when instructions in the computer-readable storage medium are executed by a processor, the processor is enabled to execute:

receiving radio resource control (RRC) configuration information and medium access control-control element (MAC-CE) activation information sent by a network device side, and determining an index value of each of control resource sets (CORESETs) and at least one transmission configuration indication (TCI) state activated in each of the CORESETs according to the RRC configuration information and the MAC-CE activation information;

determining a transmission mode of each of the CORESETs according to the activated TCI state in each of the CORESETs, wherein the transmission mode comprises a single frequency network (SFN) transmission mode and a single-point transmission mode;

selecting at least one CORESET as a to-be-monitored CORESET, wherein the to-be-monitored CORESET comprises a CORESET in the SFN transmission mode;

determining each to-be-monitored beam failure detection reference signal (BFD RS) according to a periodic channel state information reference signal (CSI RS) associated with at least one activated TCI state in each to-be-monitored CORESET; and performing beam quality monitoring based on each to-be-monitored BFD RS.

18. The non-transitory computer-readable storage medium according to claim 17, wherein when the instructions in the computer-readable storage medium are executed by the processor, the processor is enabled to execute:

sorting the CORESETs according to a preset priority rule, and selecting at least one CORESET as the to-bemonitored CORESET according to a sorting result obtained by sorting the CORESETs according to the preset priority rule.

19. The non-transitory computer-readable storage medium according to claim 18, wherein when the instructions in the computer-readable storage medium are executed by the processor, the processor is enabled to execute:

sorting the CORESETs according to index values of the CORESETs, wherein a CORESET with a smaller index value has a higher priority than a CORESET with a larger index value; or sorting the CORESETs according to the transmission mode of each of the CORESETs, wherein a CORESET in the SFN transmission mode has a higher priority than a CORESET in the single-point transmission mode; or sorting the CORESETs according to the transmission mode and an index value of each of the CORESETs, wherein the transmission mode has a higher priority than the index value, a CORESET in the SFN transmission mode has a higher priority than a CORESET in the single-point transmission mode, and a CORESET with a smaller index value has a higher priority than a CORESET with a larger index value.

20. The non-transitory computer-readable storage medium according to claim 17, wherein when the instructions in the computer-readable storage medium are executed by the processor, the processor is enabled to execute:

for each of the CORESETs, determining whether SFN configuration information of the CORESET exists in the RRC configuration information;

if the SFN configuration information of the CORESET exists in the RRC configuration information and it is determined according to the MAC-CE activation information that two TCI states are activated in the CORESET, determining that the transmission mode of the CORESET is the SFN transmission mode;

if the SFN configuration information of the CORESET exists in the RRC configuration information and it is determined according to the MAC-CE activation information that one TCI state is activated in the CORESET, determining that the transmission mode of the CORESET is the single-point transmission mode;

if no SFN configuration information of the CORESET exists in the RRC configuration information and it is determined according to the MAC-CE activation information that one TCI state is activated in the CORESET, determining that the transmission mode of the CORESET is the single-point transmission mode.

* * * * *